US 7,264,694 B2
Sep. 4, 2007

(12) United States Patent
Merrell et al.

(54) RETORT HEATING APPARATUS AND METHODS

(75) Inventors: Byron G. Merrell, Vernal, UT (US); Michael R. Keller, Tulsa, OK (US); Roger K. Noble, Tulsa, OK (US)

(73) Assignee: Oil-Tech, Inc., Morris Plains, NJ (US)

( * ) Notice: Subject to any disclaimer, the term of this patent is extended or adjusted under 35 U.S.C. 154(b) by 315 days.

(21) Appl. No.: 10/767,838

(22) Filed: Jan. 29, 2004

(65) Prior Publication Data

US 2005/0194244 A1     Sep. 8, 2005

(51) Int. Cl.
 *C10B 47/00* (2006.01)
(52) U.S. Cl. .................. 202/105; 202/82; 202/209; 202/211; 202/214; 202/215; 202/217; 202/220; 202/222; 202/247; 202/270; 202/81; 201/3; 201/5; 201/6; 201/7; 201/8; 201/19; 201/30
(58) Field of Classification Search ............... 202/82, 202/209, 211, 214, 215, 217, 220, 222, 247, 202/270, 81; 201/3, 5–8, 19, 30; 338/51, 338/159, 232, 233, 243; 208/407, 409
See application file for complete search history.

(56) References Cited

U.S. PATENT DOCUMENTS

| 1,388,153 A | 8/1921 | Williams |
| 1,447,680 A | 3/1923 | Michie et al. |
| 1,923,209 A | 8/1933 | Illingworth |
| 2,448,223 A | 8/1948 | Lantz |
| 2,494,530 A | 1/1950 | Tuttle |
| 2,609,331 A | 9/1952 | Cheney |
| 2,698,283 A | 12/1954 | Dalin |
| 2,710,828 A | 6/1955 | Scott, Jr. |
| 2,786,125 A * | 3/1957 | Drugmand et al. ......... 219/526 |
| 2,814,587 A | 11/1957 | Van Dijck |
| 2,908,617 A | 10/1959 | Murphree |
| 3,377,266 A | 4/1968 | Salnikov |
| 3,384,569 A | 5/1968 | Peet |
| 3,475,319 A | 10/1969 | MacLaren |
| 3,487,002 A | 12/1969 | Chaney et al. |
| 3,519,539 A | 7/1970 | Schulte |
| 3,562,143 A | 2/1971 | Jagel, Jr. et al. |
| 3,617,468 A | 11/1971 | Reyburn et al. |
| 3,821,353 A | 6/1974 | Weichman |
| 4,072,885 A | 2/1978 | Emark, Jr. |
| 4,075,081 A | 2/1978 | Gregoli |
| 4,133,741 A | 1/1979 | Weichman et al. |
| 4,165,216 A | 8/1979 | White et al. |
| 4,234,230 A | 11/1980 | Weichman |
| 4,280,879 A | 7/1981 | Taciuk |
| 4,285,773 A | 8/1981 | Taciuk |

(Continued)

*Primary Examiner*—Glenn Caldarola
*Assistant Examiner*—Alex Wachtel
(74) *Attorney, Agent, or Firm*—Workman Nydegger

(57) ABSTRACT

A retort heating apparatus for processing a feed material includes a heating chamber bounded at least in part by a side wall. A plurality of baffles are at least partially disposed within the heating chamber. Each baffle includes an elongated body having a top surface, at least a portion of the top surface being arched. The plurality of baffles are vertically and horizontally spaced apart so that substantially all of the feed material that vertically passes through the heating chamber is horizontally displaced as the feed material passes by the baffles. Systems are also provided for heating the feed material within the heating chamber.

70 Claims, 16 Drawing Sheets

U.S. PATENT DOCUMENTS

| | | |
|---|---|---|
| 4,373,454 A | 2/1983 | Pitrolo et al. |
| 4,419,216 A | 12/1983 | Magedanz et al. |
| 4,425,220 A | 1/1984 | Kestner, Jr. |
| 4,431,485 A | 2/1984 | Petrovic et al. |
| 4,448,668 A | 5/1984 | Deering |
| 4,459,201 A | 7/1984 | Eakman et al. |
| 4,464,247 A | 8/1984 | Thacker |
| 4,465,556 A | 8/1984 | Bowen et al. |
| 4,490,237 A | 12/1984 | Jaquay et al. |
| 4,501,644 A | 2/1985 | Thomas |
| 4,502,229 A | 3/1985 | Kitzman |
| 4,502,920 A | 3/1985 | Edwards |
| 4,511,434 A | 4/1985 | Vasalos |
| 4,589,973 A | 5/1986 | Minden |
| 4,601,811 A | 7/1986 | Lewis et al. |
| 4,601,812 A | 7/1986 | Anderson et al. |
| 4,617,107 A | 10/1986 | Mandelson et al. |
| 4,909,928 A | 3/1990 | Scinta |
| 4,948,468 A | 8/1990 | Reeves et al. |
| 4,983,278 A | 1/1991 | Cha et al. |
| 5,041,210 A | 8/1991 | Merrill, Jr. et al. |
| 5,068,010 A | 11/1991 | Mundstock et al. |
| 5,156,734 A | 10/1992 | Bowles |
| 5,643,484 A | 7/1997 | Swars et al. |
| 6,012,870 A | 1/2000 | Dillingham |
| 6,075,230 A | 6/2000 | Wilson |
| 6,328,559 B1 | 12/2001 | Sellers |

* cited by examiner

RETORT HEATING APPARATUS AND METHODS

BACKGROUND OF THE INVENTION

1. The Field of the Invention

The present invention relates to systems and methods for implementing a novel retort heating apparatus. Specifically, the present invention relates to systems and processes for producing hydrocarbon gases and liquids and other by-products from solid matter, particularly from oil shale using a retort heating apparatus.

2. The Relevant Technology

Oil consumption in the United States has been estimated to be about 20 million barrels/day. In contrast, the U.S. domestic production of oil is estimated to be about 6 million barrel/day. This imbalance between consumption and demand on the one hand, and production on the other hand, emphasizes the need for continued development in the field of alternative fuel source technology. In addition, domestic resources should be explored rather than depending on foreign oil sources. For example, national parks and other recreation areas contain rich fuel recourses, the extent of which have yet to be fully tapped. The need for continued research and development in this area is enhanced by threats to oil supply and dependence on foreign oil supplies. Furthermore, oil deposits in the U.S. are either rare or protected by law. Thus, alternatives to conventional drilling are required.

However, conventional non-drilling oil extraction processes are not cost-effective compared to conventional drilling extraction processes. Technological solutions and new methods and processes for non-drilling extraction are therefore needed. Furthermore, it would be advantageous if these novel processes and systems permitted, in contrast with conventional extractive processes, the extraction of oil and the recovery of other products that are present in the feed material, such as mineral and nitrogen compounds.

The Green River oil shale formation that extends over eastern Utah, western Colorado, and a tip of southern Wyoming, is estimated to contain over one trillion barrels of recoverable oil, which makes of this formation the richest oil formation in the world. In theory, this formation could provide a world-wide supply of oil for about 150 years. In other words, the amount of oil in the Green River shale formation has been estimated to exceed the combined amounts of oil in known oil reserves in the entire world and of oil discovered so far. Other oil shale deposits are known to exist in the U.S. and also in other countries worldwide.

Oil shale contains a rich hydrocarbon source known as kerogen. Kerogen can be broken down into oil vapors and organic liquids by retorting processes. Retorting is a process by which kerogen is decomposed into derivatives such as oil, gas and other compounds. Retorting is also known as destructive distillation, which is the decomposition of kerogen by heat in a closed container and collection of the volatile products produced.

A number of fluid bed retorts have been developed. Generally, each of these systems allows crushed feed material to flow downward by gravity through a heated column as oil vapor is drawn off the column. Although most conventional retorts function to convert oil shale to oil, conventional systems have such poor efficiency that they are not economical to operate. Furthermore, many conventional systems have systemic problems that preclude their continued operation without shutting down and cleaning out the retort chamber.

For example, many conventional retorts operate by passing a hot gas up through crushed oil shale. To enable the hot gas to pass around the oil shale, the oil shale must be provided in relatively large particles. Such systems, however, have low production efficiency in that it is difficult to sufficiently heat the center of the large particles and it is difficult for the oil vapors to escape from the center of such particles. In addition, because the particles stay substantially stagnate relative to the surrounding particles as the hot air passes over them, the particles have a tendency to agglomerate or fuse together, thereby further decreasing the efficiency of oil vapor extraction. Such agglomerations can also block the flow of the material through the retort. Heated gases are also dangerous to work with in that they can be highly explosive and require extra measures to ensure that the gas is not leaked out of the retort.

In an alternative approach to using the free flow of heated gas, conduits have been provided within a retort. The conduits are heated by passing a heated gas therethrough. As the particles pass by the conduits, the particles are heated so as to emit the oil vapor. The primary problem with this approach is that the conduits do not uniformly heat the particles. For example, some particles pass through the retort without ever contacting the conduits. Other particles become stacked on top of the conduits preventing their passage through the retort. As a result of the lack of uniform heating, there are again problems with the formation of agglomerates and with low efficiency of oil vapor extraction.

In some conventional retorts, the oil vapor product is drawn out of the retort at the top of the column at substantially the same place where feed material is supplied. Because the temperature is generally cooler at the top of the retort than at the bottom, this allows the some oil vapors to cool and condense. During condensing of the oil vapors, the oil vapors may mix with some of the feed material, forming clumps of feed material which plug the fluid bed.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The present invention is directed to retort systems and methods for using retort systems so as to extract oil and other hydrocarbons from materials that contain oil, oil precursors, or other organic materials. One example of a material that contains oil precursors is oil shale. That is, oil shale in its natural state does not contain oil but rather contains organics that when processed, such as through a retort system, can be converted into oil and hydrocarbon gases. An exemplary type of oil shale is mahogany oil shale, found in the Green River oil shale formation, which extends over eastern Utah, western Colorado, and a tip of southern Wyoming. The present invention, however, is not limited to extracting oil products from oil shale. Rather, the present invention contemplates that any material containing oil, oil precursors, or other organic materials can be processed using the methods and retort systems disclosed herein. Examples of such other materials that can be processed include: corn, grains, plants, wood, straw, animal waste, contaminated soil containing oil, coal, and other similar materials.

Figure 1:
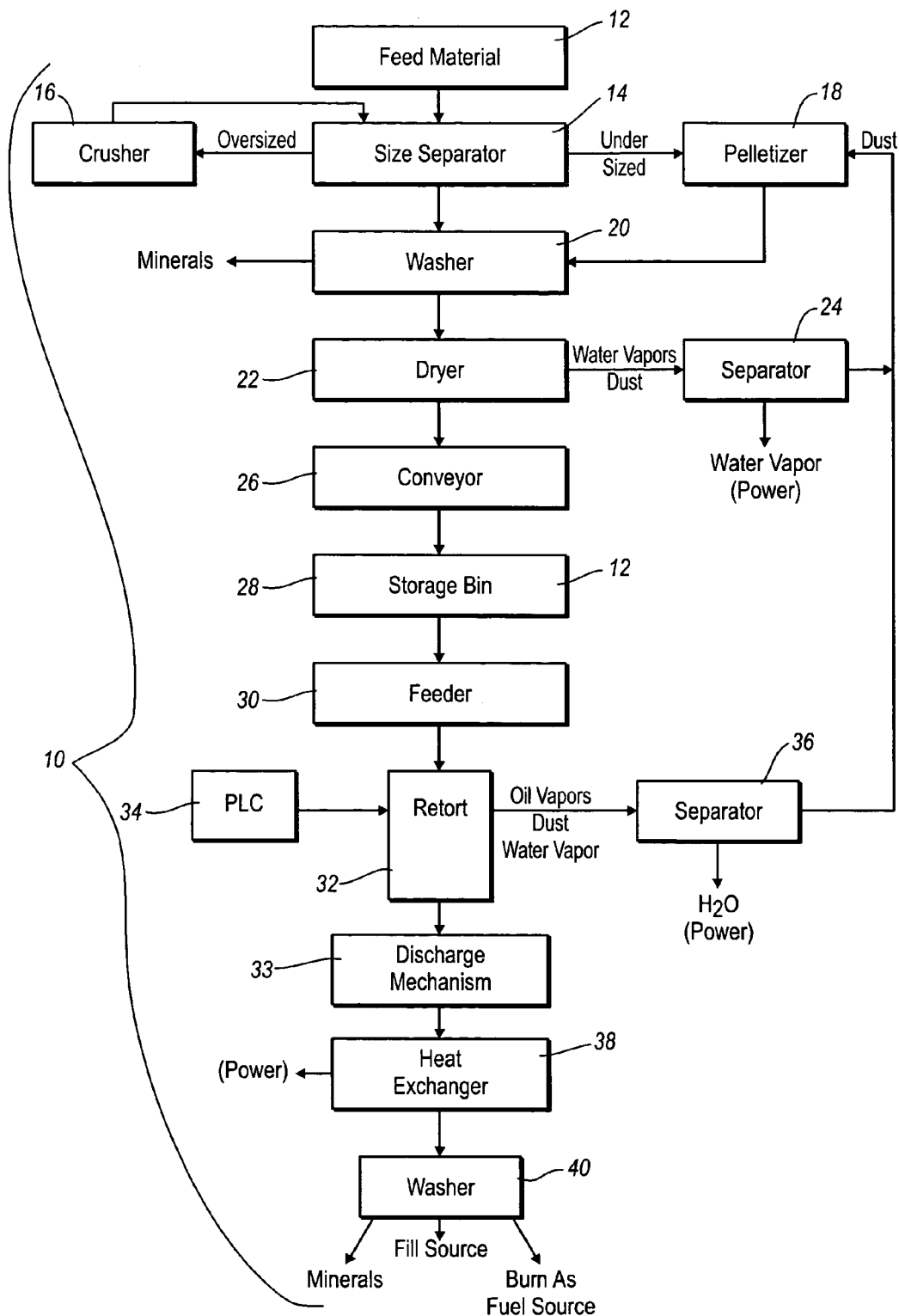
FIG. 1 illustrates a process flow diagram of a method of retorting feed material having organic precursors, according to one embodiment of the invention.

Depicted in FIG. 1 is one embodiment of a retort system 10 incorporating features of the present invention. Retort system 10 is illustrated by way of a process flow diagram. For purposes of discussing retort system 10 and the related methods, oil shale is used as an exemplary feed material. It is appreciated that the various processing steps and related parameters may be varied, switched, replaced, or even partially eliminated depending on the type of feed material being used. Such variations in the processing steps and parameters will be apparent to those of skill in the art based on the disclosure herein and do not limit or change the scope of the present invention.

Set forth below is a brief overview of retort system 10 followed by a detailed discussion of each the components and related methods of use.

I. Overview

Initially, a feed material 12 is obtained from a site. For example, in the case of oil shale, feed material 12 is extracted, such as by mining, from an oil shale deposit. Feed material 12 is then delivered to a size separator 14 which separates feed material 12 based on size. The oversized material is sent to a crusher 16 for reducing the size of the material to the desired particle size. The undersized material is sent to pelletizer 18 which forms the undersized material into pellets of the appropriate particle size. Feed material 12 having the desired size may be sent to a washer 20 which removes dust and at least a portion of any water soluble minerals and other components from feed material 12. As discussed further below, removal of the water soluble components increases the efficiency of the retort process.

The washed feed material 12 is sent to a dryer 22 which removes the moisture from feed material 12. Depending on the type of dryer 22 used, dust and water vapor are typically formed during the drying process. Separator 24 removes and separates the dust and water vapor from dryer 22. The dust may then be sent back to pelletizer 18 to be recycled into the system. The dried feed material 12 is elevated by a conveyer 26 to a storage bin 28. The feed material is then selectively fed from storage bin 28 into retort 32 by way of an automatic feeder 30.

A programmable logic control (PLC) 34 controls the operation of retort 32 and other components of system 10. Feed material 12 is heated within retort 32 causing the oil precursors within the oil shale to convert to oil vapor and various hydrocarbon gases. The oil vapor, hydrocarbon gases, water vapor and dust formed in retort 32 are drawn off and sent to a separator 36. Separator 36 may comprise a number of process steps for separating the oil vapor, hydrocarbon gases, water vapor, and dust. The oil vapor is condensed into oil which can then either be sold in that form or further processed into commercial products such as gasoline, diesel fuel, and the like. The hydrocarbon gases are separated into their various components such as methane, propane, butane, and the like. These gases can be sold or used as fuel for retort system 10. The separated dust may be sent back to pelletizer 18 to be recycled into the system. Water and other products (e.g., nitrogen products) may also be extracted or separated from the liquid oil products, as will be discussed further below.

Spent material (or solids) exiting retort 32 may be sent to a heat exchanger 38 which uses the heat from the spent material as a source of power. The spent material can then be used in a variety of different ways. For example, the spent material can be washed or otherwise processed to remove all remaining minerals or other desirable components. The spent material having a residual carbon content can also be burned as fuel or simply used as back fill. Due to the filtration properties of the spent oil shale material, such material can be effectively back filled into abandoned mines and other areas to prevent leaching of contaminates.

It is appreciated that the above described process steps and related apparatus used before and after retort 32 are merely one example of an inventive retort system. In alternative embodiments the various steps and related apparatus can be eliminated or replaced with alternatives. Furthermore, the steps and related apparatus can vary dramatically based on the material being processed, the processing location, and the desired end products. Each of the process steps and related apparatus shown in FIG. 1 will now be discussed in greater detail.

II. Feed Material

The first step is to obtain a feed material 12 that contains oil, an oil precursor, or other organics. This may consists of mining the feed material from a source deposit, reclaiming soil from a contaminated site, gathering waste product, harvesting organic material, and the like. In the embodiment where the feed material is oil shale, the feed material is generally mined from an oil shale deposit. To minimize transport costs it is desirable that the mining process and retort process occur in the same general area. Alternatively, material is mined from one site and then transported to retort system 10 at another site.

Where the feed material is oil shale, a mechanical mining system is generally used. The mechanical mining system may comprise a "long wall mining system" for seams of oil shale that are typically less than about 10 m. Alternatively, the mechanical mining system may comprise a "room and pillar mining system" for larger seams. In the long wall mining system, a mid-seam miner may also be used to cut corridors through the solid rock. As will be discussed below, in one embodiment the feed material that is processed in retort system 10 has a relatively small diameter. As a result, any mining process can be used to originally obtain the feed material. Some conventional retort systems require large diameter feed materials for processing and thus are limited in the mining processes that can be used.

III. Preparing Feed Material

The mined feed material is transported to separator 14. In one embodiment, separator 14 comprises a screening apparatus. The screening apparatus separates the feed material into undersized, optimal-sized, and oversized particles. In one embodiment, the optimal-sized feed material has a maximum diameter in a range between about 1 mm to about 15 mm with about 2 mm to about 10 mm being more common. It is appreciated that other dimensions can also be used and that the diameter of the optimal-sized feed material may differ depending on the design of retort 32 and the type of feed material. The optimal-sized feed material is passed from separator 14 to washer 20 which will be discussed below in greater detail.

The undersized feed material is sent to pelletizer 18. Pelletizer 18 forms the particles of undersized feed material into pellets of optimal-sized diameter using a standard pelletizing process. In one embodiment, an oil-based binder using liquid products from the present retort system is used to form the pellets. Other commercial binders can also be used. After the pellets are formed, they are either passed back through separator 14 or sent directly to washer 20.

In one alternative, the undersized feed material is initially mixed with water or processed with other conventional solutions to extract desired minerals from the material. Once the minerals are removed, the remaining feed material is then pelletized. After the pellets are formed, they can be sent directly to dryer 22, having already gone through a washing step.

The oversized feed material is sent to crusher 16. Crusher 16 can comprise any conventional type of rock crusher capable of crushing oil shale. Examples of crushers that can be used include hammer mills, jaw crushers, rollers and the like. The crushed material is sent again to separator 14 to separate out the optimal-sized feed material, the undersized material, and the oversized material. The above processes are repeated until all of the feed material has the optimal size.

It is appreciated that separator 14 can comprise any conventional type of screening or separator system capable of separating the feed material particles by size. For example, in another embodiment separator 14 can comprise a cyclonic separator that separates the crushed material based on size and density. In embodiments using a cyclonic separator, the initial feed material typically has a diameter of less than about 8 cm.

It is again noted that where the feed material has an initial set diameter, such as in processing corn, separator 14, crusher 16 and pelletizer 18 may not be required.

IV. Washing Feed Material

Once the feed material is sized, it is passed through washer 20. Although this step is not required, it is commonly used where the feed material has a high mineral content and/or a high dust content. That is, washer 20 is used at least in part to remove minerals and fine particulates, such as dust, from the feed material. The dust that is washed out may be sent back to pelletizer 18, as discussed above, and recycled through retort system 10 as feed material.

The minerals that are washed out of the feed material may be further processed or purified to produce a marketable commodity. In one example, mahogany oil shale found in Vernal, Utah has a high sodium carbonate ($NaCO_3$) content. The mahogany oil shale feed material is washed with hot water. The temperature of the water determines in part how much sodium carbonate is drawn out of the oil shale. For example, water at a temperature of 100° C. will take out about 10% of the sodium carbonate while water at 200° C. will take out about 20% of the sodium carbonate.

The washing step also appears to increase the yield of oil production. For example, in some tests the partial removal of sodium carbonate from oil shale through washing was found to increase the oil and gas production from the oil shale by about 25% or more. It is thought that by removing the minerals and other particulates, pores formerly filled by the minerals and particulates are now exposed. Feed material that is more porous allows heat to penetrate the feed material and allows oil vapors to escape with greater ease.

Washer 20 can comprise one or more sprayers, baths, scrubbers, streams, or other conventional washers used for removing dust or extracting minerals from rock. Combinations of the foregoing can also be used. Where the minerals are water soluble, the washing can be accomplished with water that is typically heated. In other embodiments, other types of solutions can be used to extract minerals, clean, or otherwise treat the feed material prior to further processing. It is also appreciated that the feed material can be passed through a number of different washers using the same or different solutions.

V. Drying Feed Material

Once the feed material is washed, it is sent to dryer 22 to remove moisture therefrom. The feed material is typically dried to a temperature in a range between about 100° C. to about 120° C. The feed material is typically dried without exposure to a direct flame or to a sufficiently elevated temperature that could cause oil or oil precursors in the feed material to combust. Rather, in one embodiment, drying is accomplished by injecting hot air or gas into dryer 22. Alternatively, the feed material may be dried through the use of heating elements. In either event, the feed material is typically dried in such a way that the particles of feed material do not stick together as the moisture is removed. As such, rotary type dryers are typically used. Examples of dryers that can be used include gas dryers, electrical dryers, rotary kiln dryers, and the like. Dryer 22 can comprise a single dryer or multiple dryers that are disposed either in series or parallel.

The term "dried feed material" refers to feed material from which substantially all of the water has been removed. In one embodiment the water content is reduced to less than about 10% of the total weight of feed material and water; in another embodiment the water content is reduced to less than about 5% of the total weight of feed material and water;

in still other embodiments the water content is reduced to less than about 3% of the total weight of feed material and water. As will be discussed below in greater detail, the water is removed by way of dryer 22 to prevent the formation of mud balls within retort 32.

Removing substantially all of the water in the context of the present invention means that the water that was naturally contained in the feed material has been removed from such material under the conditions prevailing in the dryer. Residual water content may remain due to, for example, exposure to and absorption of atmospheric moisture. Even if the feed material is not washed, the feed material is still typically passed through dryer 22 so as to substantially remove the ambient water content.

Separator 24 is provided to remove the water vapor and/or any dust formed during the drying step. The removal of water vapor and dust is helpful to prevent the conglomeration of the feed material in dryer 22. Conglomeration of the feed material can be detrimental in that it can produce particles that are larger than the optimal size feed material prepared at separation step 14. Such conglomerated particles can clog the flow of feed material through retort 32 as discussed below.

In one embodiment, separator 24 comprises a filtration system through which heated air from dryer 22 passes. The filtration system removes both the dust particles and the water vapor. One example of such a filtration system comprises a conventional bag house which is known to those skilled in the art. It is appreciated that dust filtration equipment may also be implemented in connection with other steps of the process besides drying. For example, a dust filtration system can also be used in association with crusher 16.

In another embodiment, separator 24 comprises a vacuum that vacuums the water vapor and dust coming off of dryer 22. In turn, the vacuumed water vapor and dust are sent to a cyclonic separator and/or an electrostatic precipitator for separation. In yet another embodiment, a scrubber can be used to separate the dust from the water vapor. The dust is typically recycled back through pelletizer 18. The water vapor can be passed through a heat exchanger or turbine to generate power prior to being released to the atmosphere. Alternatively, the water vapor and dust may be condensed into a slurry and sent to pelletizer 18 to recycle the dust back into the retort.

Other conventional separators that are used for the removal of dust and/or water vapor can also be used. Furthermore, in various alternative embodiments it is appreciated that separator 24 can be integral with or separate from dryer 22.

In addition to removal of the water vapor from the feed material, dryer 22 also functions to initially heat the feed material prior to passing into retort 32. Initial heating of the feed material increases the efficiency and operation of retort 32. Should the feed material cool below a predetermined base level, for example 80° C., prior to entering retort 32, it may be cost efficient to reheat the feed material so as to increase its base temperature and to substantially drive off an absorbed moisture.

In contrast to having dryer 22 separated from retort 32, dryer 22 can be placed directly above or adjacent to retort 32. This embodiment may be advantageous where drying is occurring in a humid environment in order to prevent the absorption of moisture from the surrounding atmosphere. This embodiment would also minimize heat loss from the feed material. In this embodiment, heat for dryer 22 could be obtained by a heat exchanger powered by retort 32 or by heated vapor passing through retort 32.

VI. Conveyance and Dispensing of Feed Material to Retort

Once the feed material is washed and dried, it is conveyed to a storage bin for selective feeding to retort 32. More specifically, conveyor 26 elevates the feed material to storage bin 28 which is disposed above retort 32. An automatic feeder 30 controls delivery of the feed material from storage bin 28 to retort 32. It is appreciated that conveyor 26, storage bin 28, and feeder 30 can come in a variety of different configuration, can be placed in different orders, and can even be eliminated in some cases. For example, as will be discussed below in greater detail, the bulk material travels down through retort 32 under the force of gravity. As such, it can be efficient to have storage bin 28 and automatic feeder 30 disposed above retort 32. However, where dryer 22 is elevated or retort 32 is lowered, the feed material can be feed directly from dryer 22 to storage bin 28 without the required use of conveyor 26. In yet other embodiments, dryer 22 can feed directly into storage bin 28 and conveyor 26 can be used to transport the feed material between storage bin 28 and automatic feeder 30.

Figure 2:
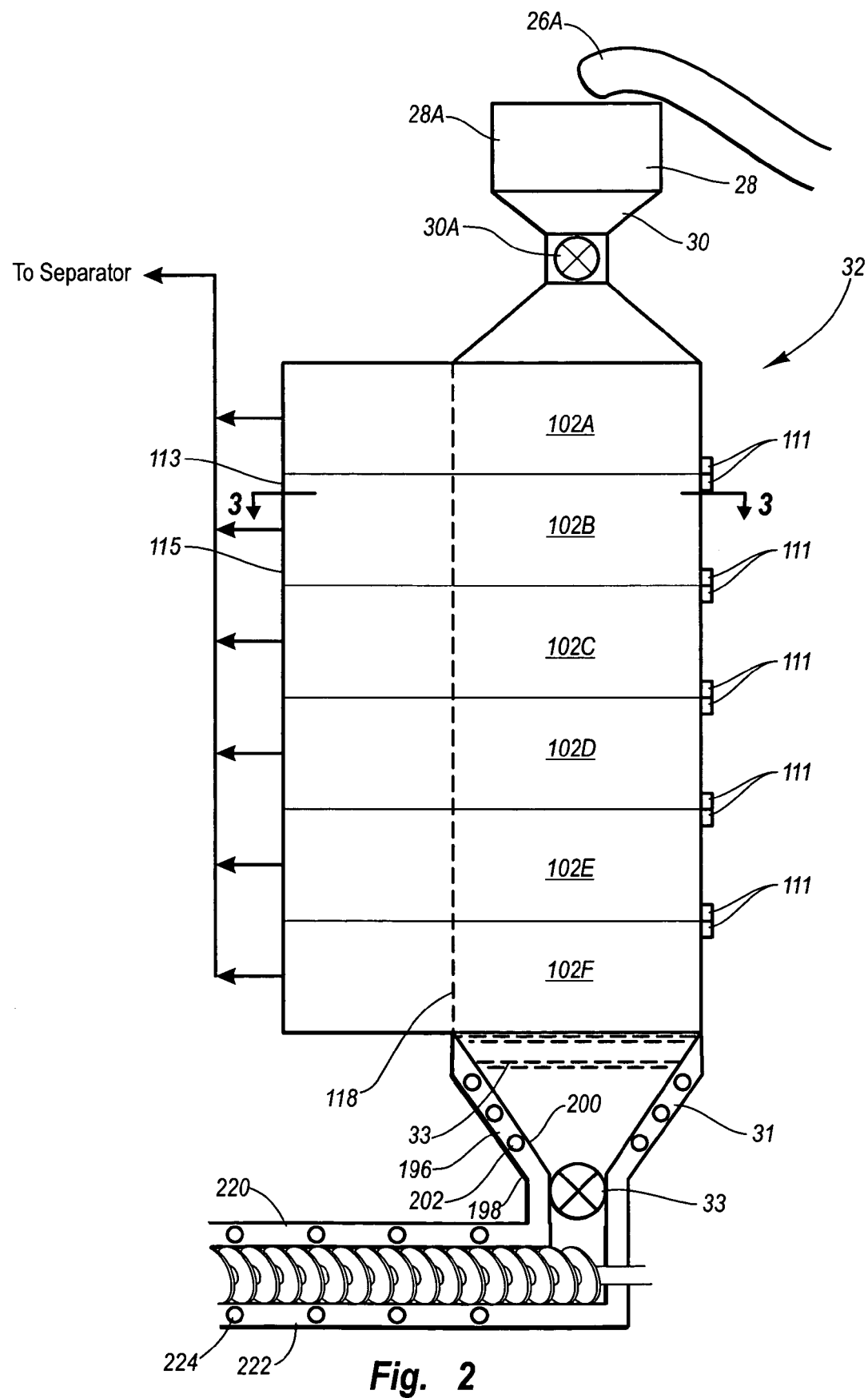
FIG. 2 is an elevated side view of a retort in accordance with an embodiment of the present invention.

In one embodiment depicted in FIG. 2, conveyor 26 includes a bucket elevator 26A. Bucket elevator 26A transports feed material to storage bin 28. In alternative embodiments, conveyor 26 can comprise a conveyor belt, auger pipe or any other conventional type of conveyor. Storage bin 28 comprises a surge bin 28A disposed above retort 32. Surge bin 28A feeds into retort 32 through automatic feeder 30. In one embodiment, the surge bin 28A located above retort 32 is large enough to contain a supply of feed material for about one hour of operation of retort 32. That is, if the mining and/or feed material preparation processes (e.g., washing and drying) were shut down, the retort 32 could still operate for about 1 hour before having to shut down.

In one embodiment of the present invention means are provided for feeding the feed material into retort 32 while preventing the free flow of air into retort 32. By way of example and not by limitation, depicted in FIG. 2 automatic feeder 30 comprises a rotary valve 30A. Rotary valve 30A operates to selectively deliver feed material into retort 32 while preventing the free flow of air into retort 32. That is, rotary valve 30A provides a rotatable seal between retort 32 and the atmosphere. Rotary valves are well known to those skilled in the art and are not further disclosed herein. Rotary valve 30A may be operated at varying rates in order to increase or decrease the flow of feed material into retort 32.

In another embodiment feeder 30 comprises a series of slotted grates that selectively slide between an open and closed position. The slotted grates bound at least one compartment. During operation a first grate opens allowing the feed material within storage bin 28 to pass into a compartment through the slots. Once a desired amount of feed material has entered the compartment, the first grate closes. The second gate then opens allowing the feed material to travel from the compartment to retort 32. Once the compartment is empty, the second grate closes and the first grate opens again allowing the feed material to enter the compartment. This process is continually repeated so that the feed material can be delivered to retort 32 without exposing the interior of retort 32 to the free flow of air. Again, the grates can be operated at such a rate that the desired feed flow rate is maintained. Other mechanisms for automatically feeding the feed material into retort 32 include screw conveyors, augers, and the like. Still other embodiments of such elements that perform analogous functions are contemplated within the scope of this invention.

In one alternative embodiment of the present invention, the feed material may be stored in a main storage container before being transported to surge bin 28A on retort 32. The main storage container may service more than one retort. In this embodiment, material is conveyed by a plurality of bucket elevators or other conveying mechanisms to a surge bin located on each retort.

In still another embodiment, storage bin 28 may comprise a pair or series of surge bins. The feed material is fed from the first surge bin into successive surge bins until it arrives at the desired retort. In one design the series of surge bins are located at subsequent lower levels so that gravitational forces can be used to deliver feed material from one surge bin to the next surge bin. Alternatively, a bucket elevator or other conveying mechanism may elevate material from one surge bin to the next surge bin. In view of the foregoing, different configurations exist for conveying and feeding the feed material to retort 32.

VII. Modular Retort

As mentioned above, depicted in FIG. 2 is one embodiment of retort 32 incorporating features of the present invention. As used herein, the term "retort" refers to a heating unit for heating various forms of hydrocarbon compounds. In the embodiment depicted, retort 32 is comprised of multiple, substantially identical modular units 102A–102F that are vertically stacked.

Each modular unit 102 has a substantially similar block-shaped configuration such that in one embodiment modular units 102 can be interchangeable. This modular assembly and uniform shape enables retort 32 to be easily disassembled, moved and reassembled. The modular assembly also simplifies manufacture and enables easy adjustment of retort 32 so as to accommodate processing of different feed materials at different parameters. That is, the number of modular units 102 in retort 32 is chosen in part based on the composition of the feed material to be treated and the desired products.

Figure 3:
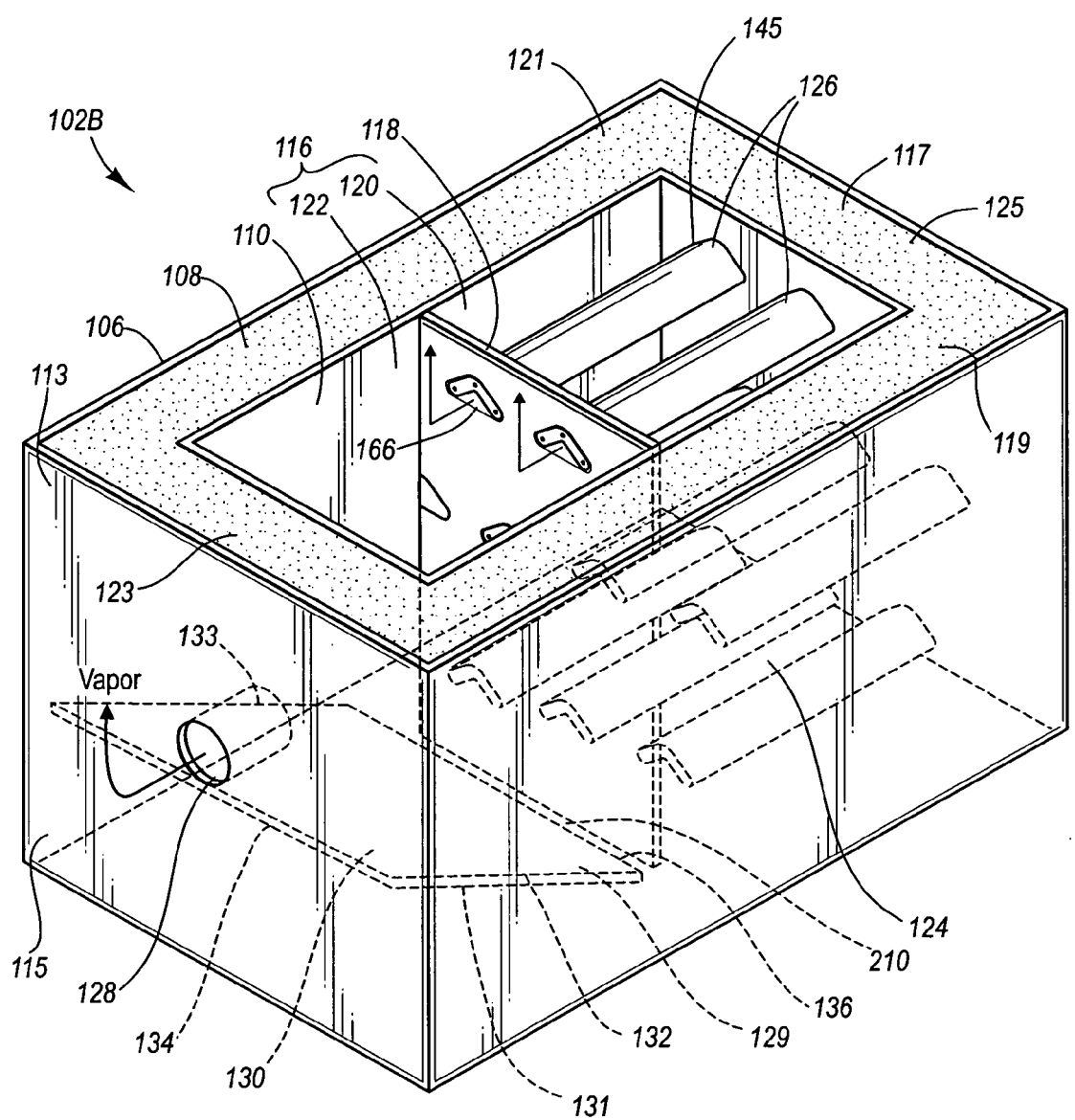
FIG. 3 is a perspective view of a modular unit of the retort shown in FIG. 2.

The components of modular unit 102A–102F will now be discussed primarily with reference to modular unit 102B. It is understood, however, that the remaining modular units 102A and 102C–F have substantially the same components. As depicted in FIG. 3, modular unit 102B has a top end 113 and an opposing bottom end 115. Extending between opposing ends 113 and 115 is an outer housing 106 and a concentrically disposed inner housing 110. Each of outer housing 106 and inner housing 110 has a substantially rectangular or square transverse cross section. It is appreciated, however, that housings 106 and 110 can be any desired configuration such as, but not limited to, circular, oval, irregular or other polygonal shape. Outer housing 106 and inner housing 110 are typically formed of a metal such as steel, stainless steel, or cast iron. Other materials, however, can also be used. In one embodiment, housing 106 and 110 are each comprised of stainless steel sheets having a thickness in a range between about 3 mm to about 10 mm.

Disposed between outer housing 106 and inner housing 110 is a thermal insulation layer 108. In one embodiment insulation layer 108 is comprised of a refractory material having a thickness in a range between about 10 cm to about 30 cm. The refractory material can be comprised of brick or other refractory material known in the art. It is appreciated that in alternative embodiments inner housing 110 can be eliminated so that insulation layer 108 is openly exposed within retort 32.

Housings 106 and 110 and insulation layer 108 combine to form a perimeter wall 117. Perimeter wall 117 bounds a central compartment 116 and comprises a front wall 119, a back wall 121, and a pair of opposing side walls 123 and 125 extending therebetween. Central compartment 116 is divided by a vertically disposed partition wall 118 extending between front wall 119 and back wall 121. Partition wall 118 can be constructed of the same materials as previously discussed with regard to inner housing 110. Partition wall 118 divides central compartment 116 into a heating chamber 120 and a vapor chamber 122. In one embodiment both heating chamber 120 and vapor chamber 122 have a depth extending between front wall 119 and back wall 121 in a range between about 2 m to about 3 m and a width extending between partition wall 118 and a corresponding side wall in a range between about 0.5 m to about 1 m. Likewise, each modular unit 102 typically has a height in a range between about 2 m to about 3 m. Of course the above dimensions are simply one example and other dimensions can also be used.

In one embodiment of the present invention, means are provided for heating perimeter wall 117 and/or partition wall 118. By way of example and not by limitation, electrical heating elements 109 (FIG. 8) are disposed within insulation layer 108 adjacent to inner housing 110. Heating elements 109 can be disposed all along inner housing 110 and can also be disposed on or within partition wall 109 for heating perimeter wall 117 and partition wall 118. In other embodiments, conduits can be formed on or through perimeter wall 117 and partition wall 118 so that heated gases or heated fluid can be passed therethrough. Other conventional mechanism can also be used to heat perimeter wall 117 and/or partition wall 118.

Figure 4:
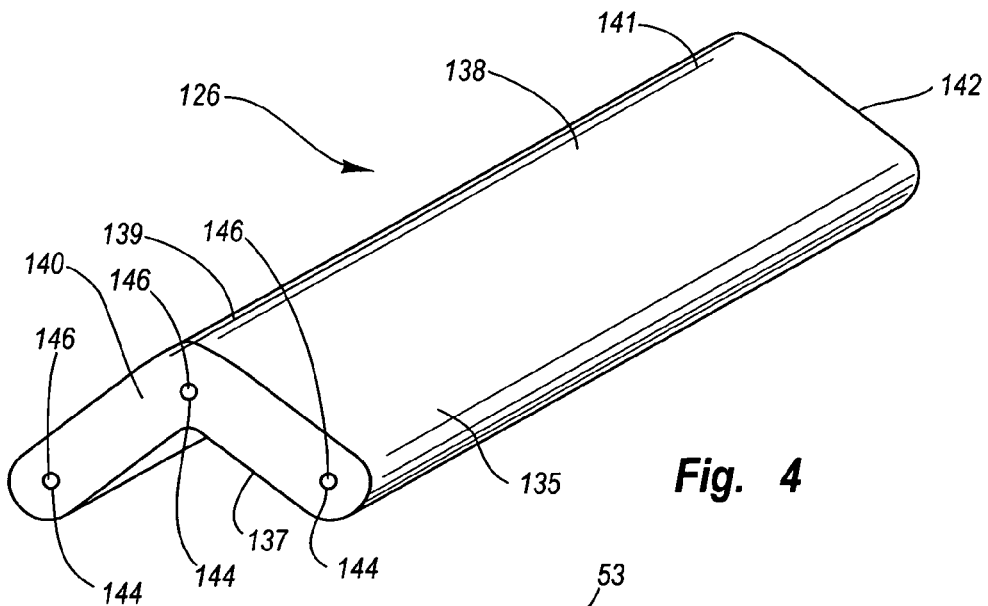
FIG. 4 is a perspective view of a baffle of the modular unit shown in FIG. 3.

Extending between side wall 125 and partition wall 118 so as to be disposed within heating chamber 120 is an array of spaced apart baffles 126. As depicted in FIG. 4, each baffle 126 comprises an elongated body 138 having an inverted substantially V-shaped transverse cross section. Body 138 has a top surface 135 and an opposing bottom surface 137 each extending between a first end 139 and an opposing second end 141. First end 139 terminates at a first end face 140 while second end 141 terminates at a second end face 142.

Figure 5:
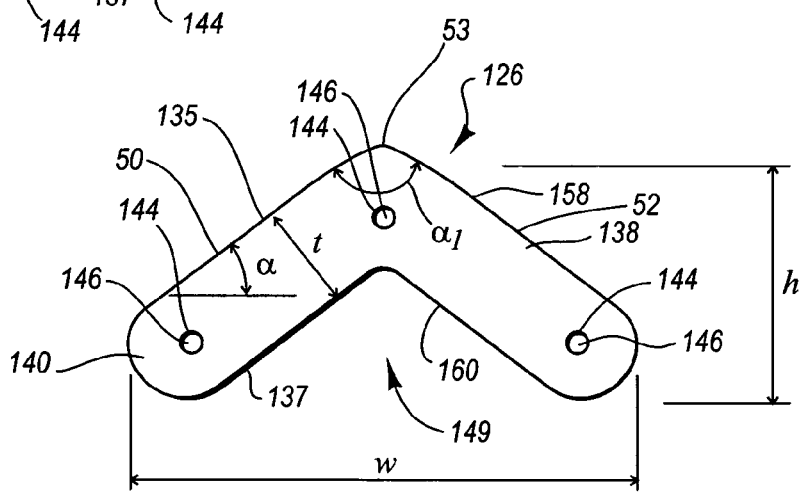
FIG. 5 is an elevated side view of the baffle shown in FIG. 4.

As depicted in FIG. 5, body 138 also has height h and width w each in a range between about 5 cm to about 15 cm. Body 138 also has a thickness t extending between top surface 135 and bottom surface 137 in a range between about 2 cm to about 4 cm. Other dimensions can also be used. Top surface 135 has a first side face 50 and an opposing second side face 52 which are each disposed in diverging planes so as to have a substantially inverted V-shaped configuration. In one embodiment, each of side faces 50 and 52 are disposed in a plane forming an inside angle α relative to the horizontal in a range between about 45° to about 85° with about 55° to about 75° being more common and about 63° being even more common. Side faces 50 and 52 can also form an inside angle between the faces in a range between about 1° to about 70° with about 20° to about 60° being more common.

Side faces 50 and 52 intersect along a narrow ridge 53. Narrow ridge 53 ensures that the feed material moves down one of side faces 50 and 52 as opposed to vertically stacking on top of ridge 53. Although narrow ridge 53 can be slightly rounded it should not be so rounded or flat as to cause the feed material to vertically stack on top thereof.

As will be discussed below in greater detail, top surface 135 functions in part to deflect the feed material as it passes down through heating channel 120 so that the feed material is maintained in a continuous and dynamic mixing flow. Although top surface 135 can have a variety of different configurations, if the apex of top surface 135 becomes too flat, a few of the particles of feed material can rest and stagnate thereon. Due to the heat subjected to the stagnate particles, the particles fuse together creating a larger surface area on which more particles can fuse. The fused particles continue to grow until they block the flow of the feed material through the baffles 126. It is then necessary to disassemble and clean retort 32. It is also noted that some curved or irregular portions of top surface 135 can cause the feed material to travel at different speeds as it passes over top surface 135. Again, this change in speed can result in a stacking of some of feed material within retort 32.

In contrast, narrowing the apex or ridge 53 of top surface 135 forces the feed material to flow down side face 50 or 52, thereby eliminating stagnate particles. The extent to which ridge 53 can be rounded is dependent on a number of factors such as the size of the feed material and the speed of the feed material passing through retort 32. The rounding of ridge 53 can also be adjusted based on the application of external forces such as the vibration of retort 32. By way of example, in one embodiment ridge 53 has a radius of curvature that is less than four times the maximum diameter of the feed material, more commonly less than twice the maximum diameter of the feed material, and even more commonly less than the maximum diameter of the feed material. In yet other embodiments, the radius of curvature or ridge 53 can be equal to or less than about 0.5 times the maximum diameter of the feed material. Other dimensions can also be used.

Figure 5A:
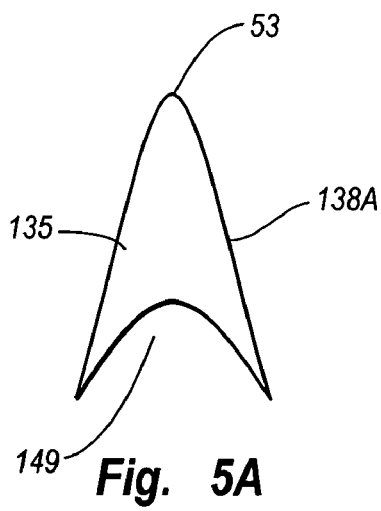
FIGS. 5A–5I are elevated side views of alternative embodiments of the baffle shown in FIG. 5.
Figure 5B:
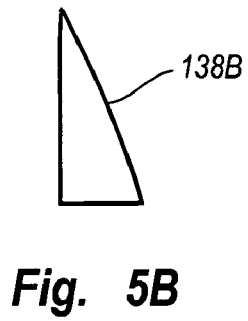
Figure 5C:
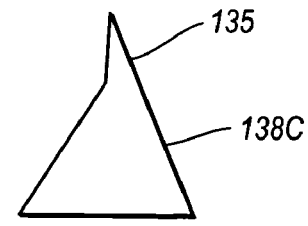
Figure 5D:
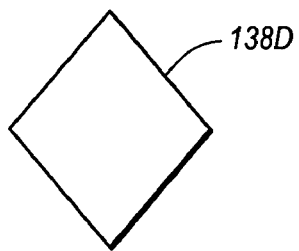
Figure 5E:
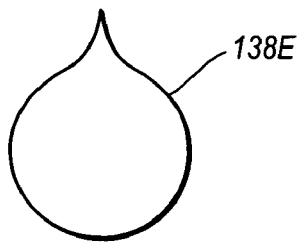
Figure 5F:
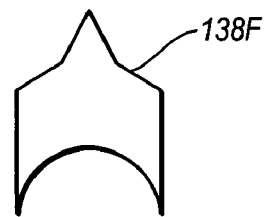
Figure 5G:
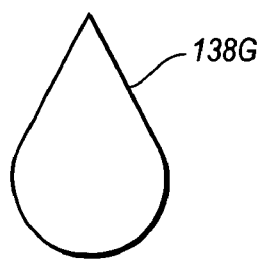
Figure 5H:
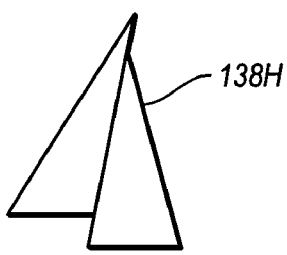

Depicted in FIGS. 5A–5I are a plurality of different bodies 138A–I each having a corresponding top surface 135 with a ridge 53. As depicted in FIG. 5A, it is appreciated that top surface 135 can have an inverted substantially U-shaped configuration. It is noted with regard to FIGS. 5B and 5C that the body need not be symmetrical. The alternative bodies also illustrate that a single body can be comprised of a variety of different shapes. Furthermore, as noted in FIG. 5I, the body need not be vertically oriented during use but can be oriented to any desired angle. In view of the forgoing it is appreciated that a variety of other shapes can also be used.

Returning to FIG. 5, bottom surface 137 also has a substantially inverted V-shaped transverse cross section. As a result, bottom surface 137 at least partially bounds a collection channel 149 extending along the length of body 138. Bottom surface 137 is configured in part to capture oil vapors and gases emitted from the feed material. To achieve this function, bottom surface 137 can come in a variety of different configurations. Furthermore, bottom surface 137 can have an inverted substantially U-shaped configuration or can have any number of curved, rounded, sloped, irregular, or combined surfaces that form a cupped surface capable of capturing gas and oil vapors.

In one embodiment of the present invention means are provided for selectively heating baffle 126. By way of example and not by limitation, a plurality of spaced apart channels 144 extend from first end face 140 of body 138 to or toward second end face 142. Disposed within channels 144 is a conventional electrical resistance filament 146. In alternative embodiments, filaments 146 can be disposed on bottom surface 137 or otherwise disposed on body 138 so as to heat body 138. In yet other embodiments of the means for heating baffle 126, fluid conduits are formed within body 138. Heated gases or fluids are pumped or otherwise passed through the fluid conduits so as to heat body 138.

The material for body 138 is chosen so as to withstand the desired operational temperature range. In one embodiment, body 138 is heated to a temperature in a range between about 400° C. to about 600° C. Examples of materials that can be used for body 138 include cast iron, iron alloys, stainless steel, beryllium, beryllium alloys, ceramic, graphite with a titanium carbide surface treatment, or copper alloys, such as materials comprising 99% Cu and about 1% of other elements, such as Cr, Be, or combinations thereof. Other materials having the desired properties can also be used. As different baffles 126 may be heated to different temperatures and subject to different load forces, different bodies 138 can be made of different materials and have different sizes.

Figure 6:
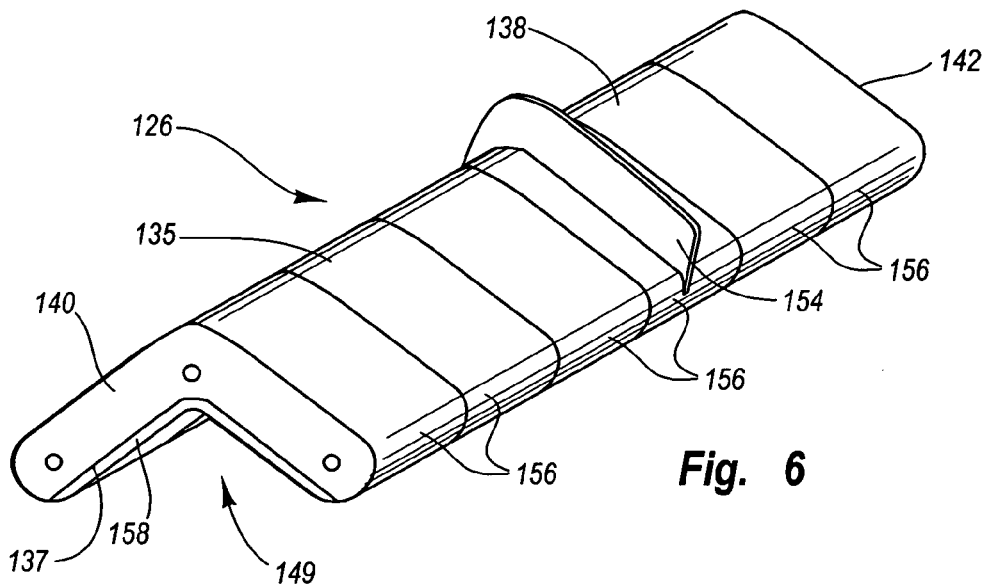
FIG. 6 is a perspective view of an alternative embodiment of the baffle shown in FIG. 4.

Depending on the hardness of the material for body 138, drilling channels 144 to house filaments 146 can be difficult or even prohibitively time consuming. As depicted in FIG. 6, body 138 may comprise a plurality of smaller segments 156 having a similar cross-sectional configuration. Channels 144 are formed in segments 156. Subsequently, segments 156 are assembled together to form body 138 of baffle 126. Alternatively, areas where channels 144 are to be drilled in body 138 may be constructed of a softer metal, such as copper, that can be drilled with conventional equipment.

In another alternative embodiment as depicted in FIG. 6, an insulation layer 158 is formed or otherwise secured on bottom surface 137. Insulation layer 158 thus partially bounds collection channel 149. Insulation layer 158 has a temperature lower than top surface 135 during operation so that as the oil vapor is collected and passed through collection channel 149, the oil vapor is not super heated and converted into a non-condensable gas. If the oil vapors are over heated, they can thermally crack. This produces non-condensable vapors and also leaves carbon (coke) deposits on the surface of the baffles. Insulation layer 158 can comprise ceramic, other refractory materials, or other insulation materials that can withstand the operating temperatures.

In still another alternative as depicted in FIG. 6, one or more spaced apart fins 155 can be formed so as to outwardly project from top surface 135 of body 138. Fins 155 are disposed so as to transversely extend across body 138 and are used to more efficiently conduct the heat energy to the feed material. Fins 155 can be made of the same material as body 138.

Figure 7:
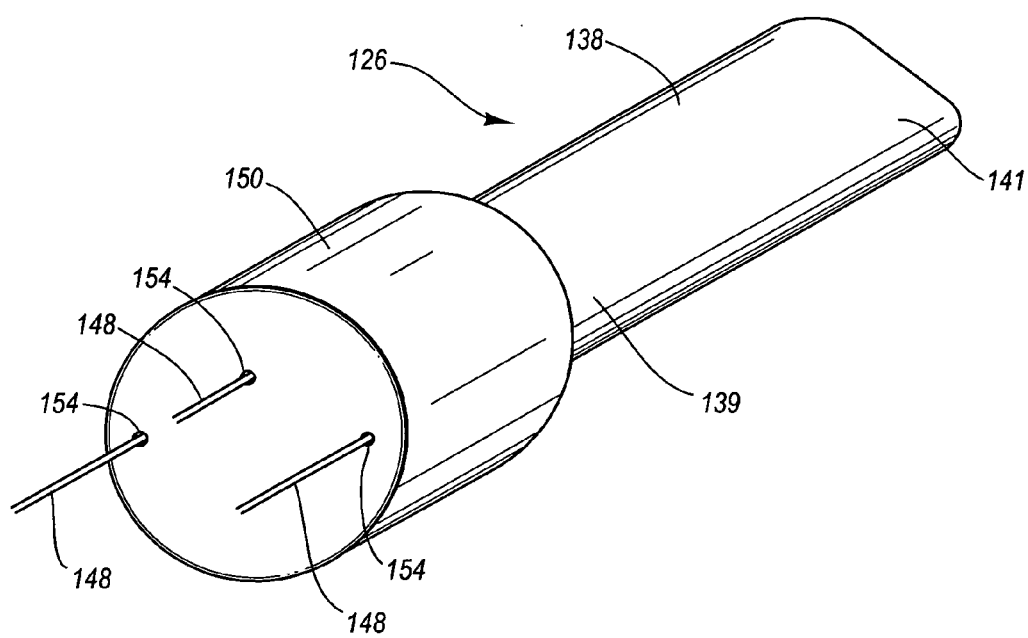
FIG. 7 is a perspective view of the baffle shown in FIG. 4 further comprising an insulating plug.

In the embodiment illustrated in FIG. 7, an insulating plug 150 is secured at first end 139 of body 138. Plug 150 is typically comprised of a refractory material or other insulating material capable of withstanding the operating temperatures. Although plug 150 is shown having a substantially cylindrical configuration, in alternative embodiments plug 150 can have any desired cross-sectional shape. Channels 154 extend through plug 150. Insulated wiring 148 that is coupled with electrical resistance filament 146 extends through channels 154 and projects from plug 150. As discussed below in greater detail, wiring 148 extends to programmable logic control (PLC) 34 (FIG. 1) that provides electricity for selectively heating filaments 146.

In one embodiment, extra channels 144 and 154 can be used to secure plug 150 to body 138. For example, by threading channel 144 on body 138, a bolt can be passed through a corresponding channel 154 on plug 150 and then screwed into the threaded channel 144 so as to secure plug 150 to body 138. Other connecting assemblies as understood by those of skill in the art can also be used. Furthermore, plug 150 can be formed directly on body 138 or body 138 can be frictionally held within a corresponding slot formed on plug 150.

Figure 8:
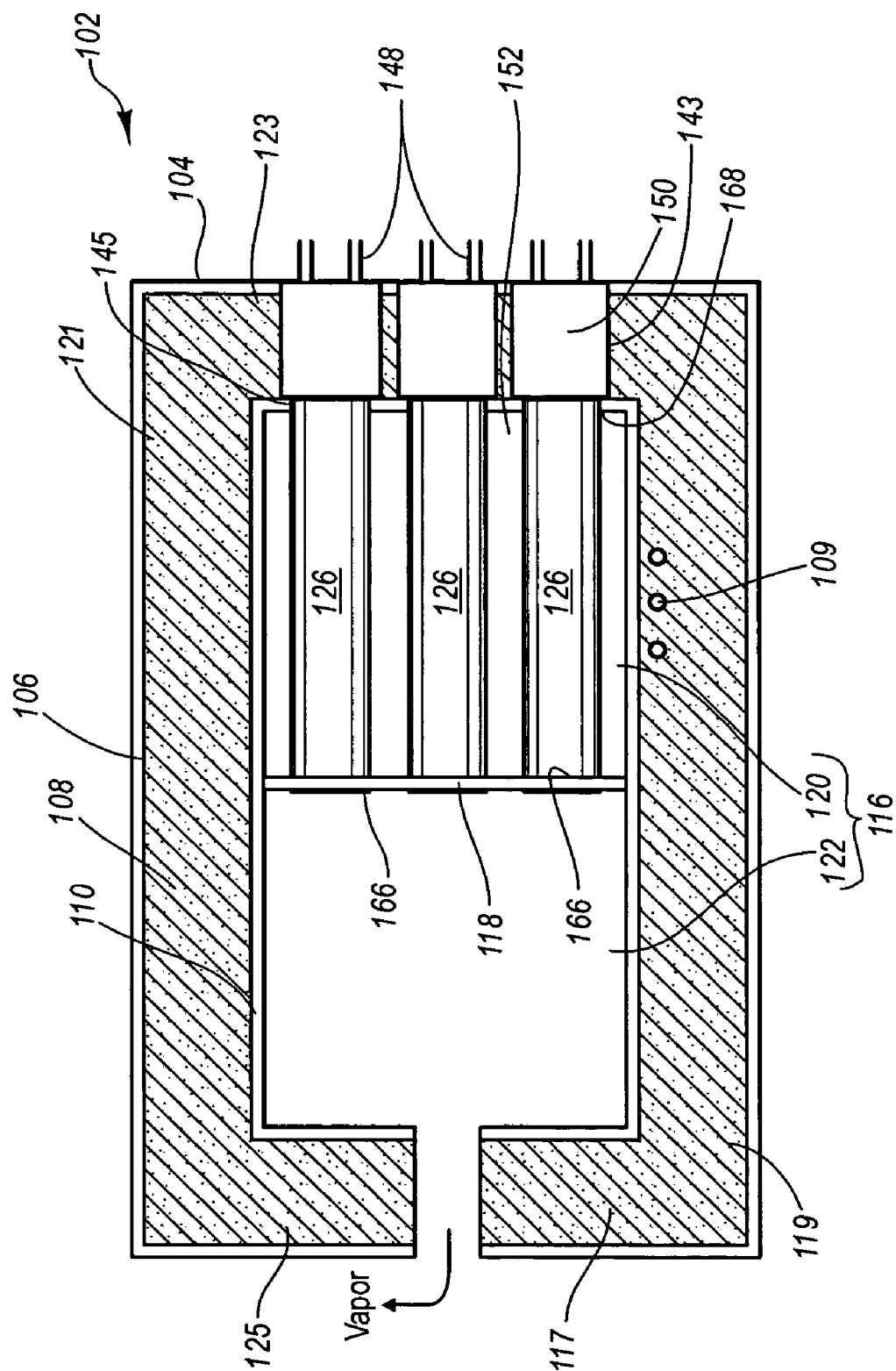
FIG. 8 is a cross sectional top view of the modular unit shown in FIG. 3.

Turning to FIG. 8, a plurality of spaced apart sockets 143 are formed on side wall 123 so as to extend through outer housing 106 and at least a portion of insulation layer 108. Sockets 143 have a configuration complementary to plugs 150. An aperture 145 extends through inner housing 110 in alignment with each socket 143. Apertures 145 have a configuration complementary to the transverse cross sectional configuration of body 138. Furthermore, as will be discussed below in greater detail, a plurality of substantially triangular apertures 166 (FIG. 3) extend through partition wall 118 in alignment with apertures 145. During assembly, second end 141 of each baffle 126 is passed through a corresponding socket 143 and aperture 145 and then advanced into or through an aperture 166 on partition wall 118. As a result, plug 150 is received within the socket 143 and the baffle 126 is suspended and supported between partition wall 118 and side wall 123. In this configuration body 138 of each baffle 126 is horizontally disposed within heating chamber 120. Plugs 150 are substantially complementary to sockets 143 so as to minimize the loss of heat therebetween and to minimize any air passing therebetween and into heating chamber 120.

In one embodiment baffles 126 remain removably disposed within sockets 134 and apertures 145, 166. In this configuration baffles 126 can be accessed and removed from outside of perimeter wall 117. As such, baffles 126 can be individually removed, exchanged and/or replaced. Baffles 126 can also be accessed for a number of tasks such as cleaning and temperature testing. Furthermore, this design allows removal of baffles 126 in order to remove an obstruction, such as a clinker or mud ball, within heating chamber 120. In an alternative embodiment, baffles 126 may be integrally formed with or otherwise rigidly secured to side wall 123 and/or partition wall 118. In yet other embodiments, some of baffles 126 are rigidly secured to side wall 123 and partition wall 118 so as to provide structural support to modular unit 102 while other baffles 126 can be removably mounted. In like manner it is appreciated that some baffles 126 can be heated while others are not. It is likewise appreciated that some baffles 126 can be designed without a collection channel 149. See for example, FIGS. 5B–5E. In these embodiments select baffles are designed for heating and/or mixing. In the same retort, select baffles can be designed with a collection channel 149 but may not be heated. These baffles are designed for mixing the feed material and collecting vapors. A single retort can thus be designed having a number of different types, sizes and configurations of baffles.

Figure 9:
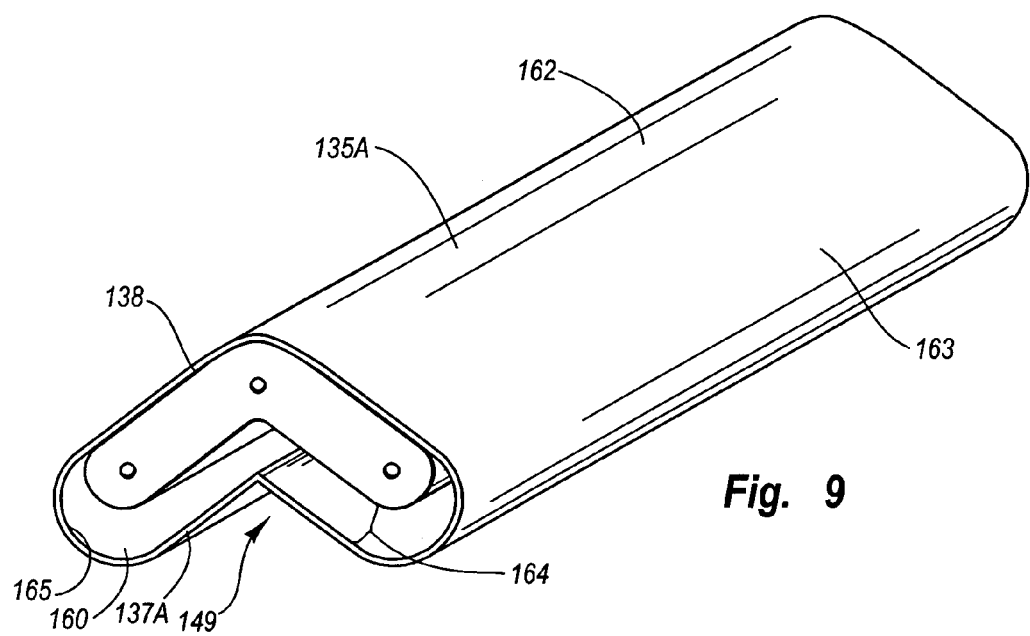
FIG. 9 is a perspective view of another alternative embodiment of the baffle shown in FIG. 4.

Depicted in FIG. 9 is another alternative embodiment of a baffle 162. In this embodiment, baffle 162 comprises a tubular body 163 having a top surface 135A and an opposing bottom surface 137A. Each tubular body 163 extends between partition wall 118 and side wall 123. Surfaces 135A and 137A have the same configurations and alternatives as previously discussed with surfaces 135 and 137 of baffle 126 such that baffle 162 also function to deflect feed material and collect gases and/or oil vapors. Body 163, however, also has an interior surface 165 that bounds a compartment 160 extending along the length of body 163.

One embodiment of the means for heating baffle 162 comprises inserting body 138 into compartment 160 of baffle 162 and heating body 138 using one of the embodiments as previously discussed. One of the benefits of using baffle 162 is that body 138 used in conjunction with plug 150 can be removably disposed within compartment 160. Since the feed material contacts baffle 162 and not body 138, body 138 can be selectively removed for replacement, cleaning, inspection or the like even during operation of retort 32.

In the embodiment depicted, body 138 rests directly against top surface 135A for optimal heating of top surface 135A. Although not required, a gap 164 is formed between body 138 and bottom surface 137A. Gap 164 provides an insulation layer between body 138 and bottom surface 137A to prevent super heating of the oil vapors that are collected within collection channel 149. In other embodiments, a physical insulation layer can be disposed between body 138 and bottom surface 137A. Because body 138 no longer directly contacts the feed material, it is appreciated that body 138 can comprise any number of alternative configurations of heating elements that are capable of heating baffle 162. Baffle 162 may be comprised of any material such as stainless steel, cast iron, ceramic, graphite, or the like that is capable of withstanding the operating loads and temperatures.

Figure 10:
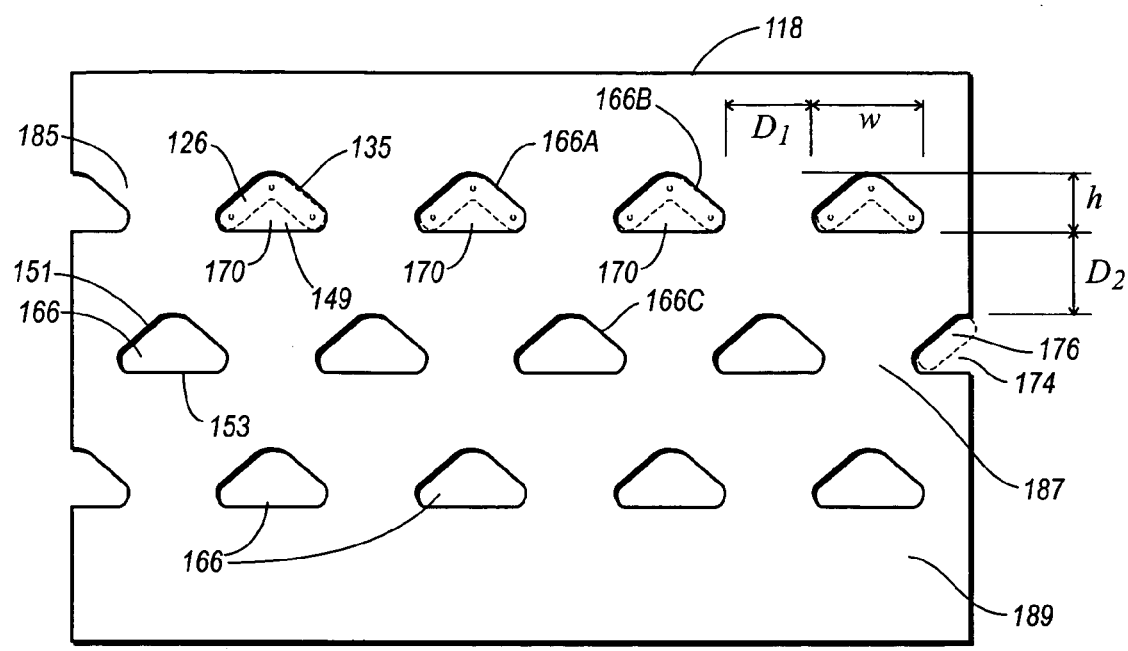
FIG. 10 is an elevated side view of a partition wall of the modular unit shown in FIG. 3.
Figure 11:
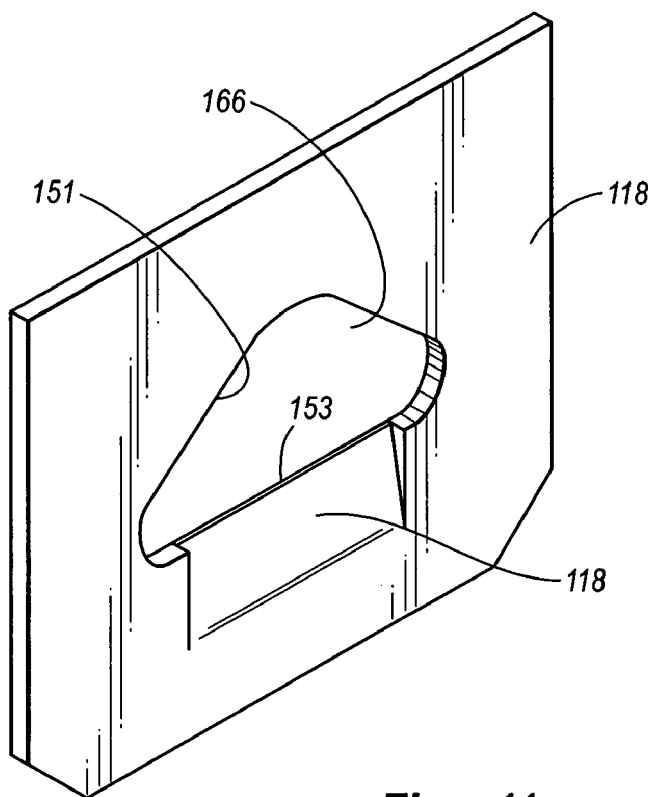
FIG. 11 is a perspective view of an aperture of the partition wall shown in FIG. 10.

The triangular apertures 166 formed on partition wall 118 are further depicted in FIG. 10. As shown therein, each aperture 166 has an inverted substantially V-shaped top edge 151 and a substantially flat bottom edge 153. Top edge 151 has a contour complementary to top surface 135 of baffle 126. Accordingly, as the second end of baffle 126 is received within aperture 166, baffle 126 is supported on bottom edge 153 while a close tolerance is formed between top surface 135 of baffle 126 and top edge 151 of aperture 166. The residual of aperture 166 not occupied by baffle 126 forms an opening 170 extending through partition wall 118. Opening 170 enables collection channel 149 of baffle 126 to communicate through partition wall 118. As shown in FIG. 11, the portion of bottom edge 153 not directly supporting baffle 126 is tapered to a fine edge so as to prevent the unwanted buildup of dust or particles on bottom edge 153.

FIG. 10 also discloses one configuration for an ordered array of baffles 126 in heating chamber 120. Specifically, FIG. 10 is a side view of partition wall 118 showing apertures 166 disposed in staggered rows. A first row 185 is shown where apertures 166, and thus baffles 126, are horizontally separated by a distance $D_1$. In one embodiment distance $D_1$ is in a range between about 5 cm to about 15 cm and is typically equal to the width w of body 138. Other dimensions can also be used. A second row 187 of apertures 166/baffles 126 having the same horizontal separation as first row 185 are vertically disposed below first row 185 by a vertical distance $D_2$. Distance $D_2$ extends between the bottom of first row 185 and the top of second row 187. In one embodiment distance $D_2$ is in a range between about 5 cm to about 40 cm with about 5 cm to about 10 cm being more common, although other dimensions can also be used. Although not required, in one embodiment the distance $D_2$ is equal to the height h of baffles 126.

Apertures 166 in second row 187 are centrally disposed between apertures 166 of first row 185. In turn, a third row 189 of apertures 166 is vertically disposed below second row 187 so as to be in alignment with apertures 166 of first row 185. This staggering of alternate rows is repeated for additional rows of apertures 166.

To ensure that the feed material does not free fall along front wall 119 and back wall 121 bounding heating chamber 120, half apertures 174 are formed at alternating ends of rows 185, 187, and 189. A half baffle 176, which comprise one leg of baffle 126, is disposed within each half aperture 174. Half baffles 176 can be heated or not heated. In either event, half baffles 176 periodically deflect the feed material away from front wall 119 and back wall 121 so as to engage against the next lower baffle 126. Besides providing stirring motion to the oil shale and avoiding stationary oil shale adjacent to the wall, the half baffles 176 mitigate the vertical movement of vapors up the wall thus bypassing the collectors.

As mentioned above and discussed below in greater detail, during operation the feed material is passed down through heating chamber 120 so that the feed material contacts and passes over baffles 126. As the feed material is heated by baffles 126, the oil and oil precursors are converted into gases and/or oil vapors that are subsequently collected. The size, configuration, spacing, staggering, and other parameters of baffles 126 are designed in part to ensure that the feed material is uniformly heated and mixed as it travels down retort 32. The parameters for baffles 126, however, are also set to ensure that the feed material can freely flow down through the baffles 126 under the force of gravity at a desired speed without significant stacking, clogging, or fusing together.

For example, by having the distance $D_1$ between baffles 126 equal to the width w of baffles 126 and then by staggering the rows of baffles as discussed above, there are no straight paths down through baffles 126. Rather, the feed material is required to continually contact and move around baffles 126 to obtain the desired heating. Furthermore, by vertically spacing the rows of baffles 126 as discussed above, the moving and mixing of the feed material is substantially constant. As a result, the feed material is uniformly heated and no two particles are left in contact for a sufficient period of time to permit them to fuse together so as to form a clinker. Finally, the parameters for baffles 126 also prevent portions of the feed material particles from stacking or otherwise becoming stagnant within retort 32. Stagnant feed material particles, as discussed above, can eventually block the flow of feed material or produce clinkers that block the flow through baffles 126.

It is appreciated that a variety of different combinations of parameters for baffles 126 can be used to achieve optimal performance and that the optimal parameters may be different for different feed material and different sizes of feed material. Furthermore, the use of other alternatives such as vibration of modular units 102 can affect optimal parameters.

Set forth below is one example of parameters as set forth in FIGS. 5 and 10:

$\alpha = 63°$
w=7.5 cm
h=9 cm
$D_1$=7.5 cm
$D_2$=10 cm

Figure 10A:
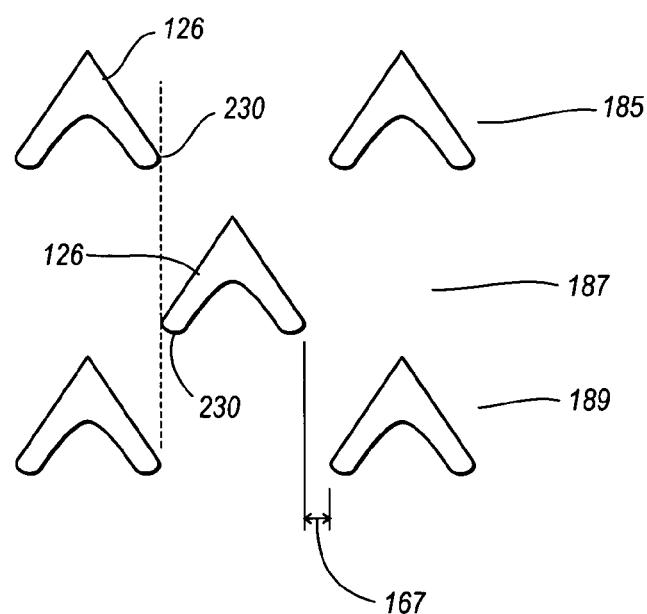
FIG. 10A is an elevated side view showing alternative placements of the baffles shown in FIG. 10.

Baffles 126 can also be secured and staggered in a variety of other configurations. For example, in contrast to FIG. 10 wherein where alternating rows of baffles 126 vertically overlap, depicted in FIG. 10A alternating rows of baffles 126 can be placed so that the outer ends 230 of baffles 126 are vertically aligned as opposed to overlapping. In the same figure, it is also depicted that alternating rows of baffles 126 can be positioned so that a small vertical gap 167 is formed between outer ends 230 of adjacent vertical rows of baffles. Gap 167 has a width smaller than the smallest diameter of the feed material. As a result, in each of the above embodiments all of the feed material is still required to be moved and mixed in a horizontal component as the feed material passes down through baffles 126.

Figure 12:
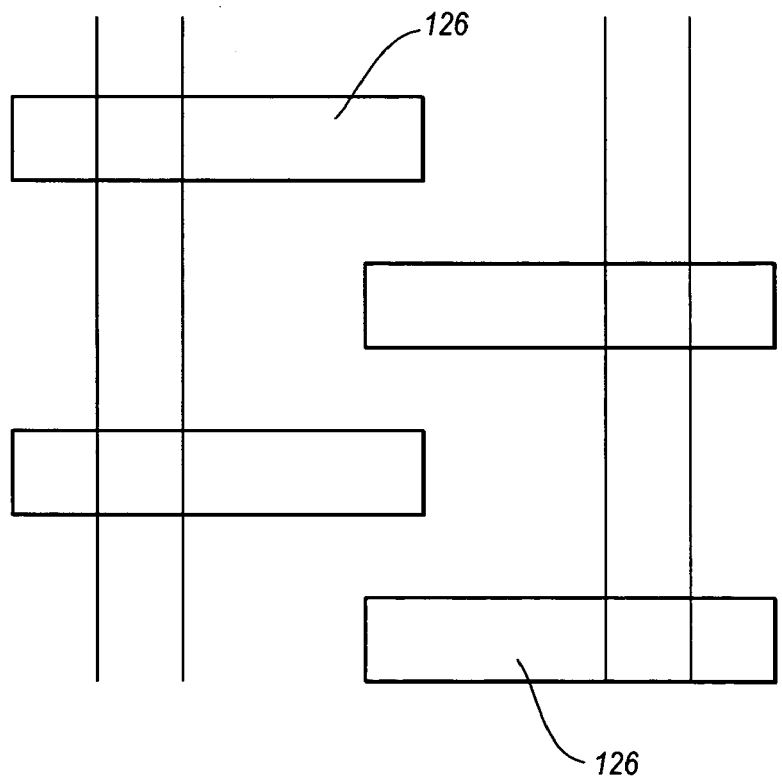
FIG. 12 is a cross sectional side view showing how the baffles in FIG. 3 can be cantilevered and positioned.

In another embodiment depicted in FIG. 12, baffles 126 need not extend between opposing side walls but can extend as a cantilever from one side wall. Likewise, different baffles 126 can extend from different side walls in a cantilever fashion. Each baffle 126 can serve the same function or different baffles 126 can serve different functions. For example, some baffles 126 can be designed for heating while other are designed to collect vapors. In the various embodiments of the present invention, it is also envisioned that they need not all extend in the same direction. For example, some baffles can be rotated horizontally so as to be 90° or other angles relative to other baffles.

Figure 13:
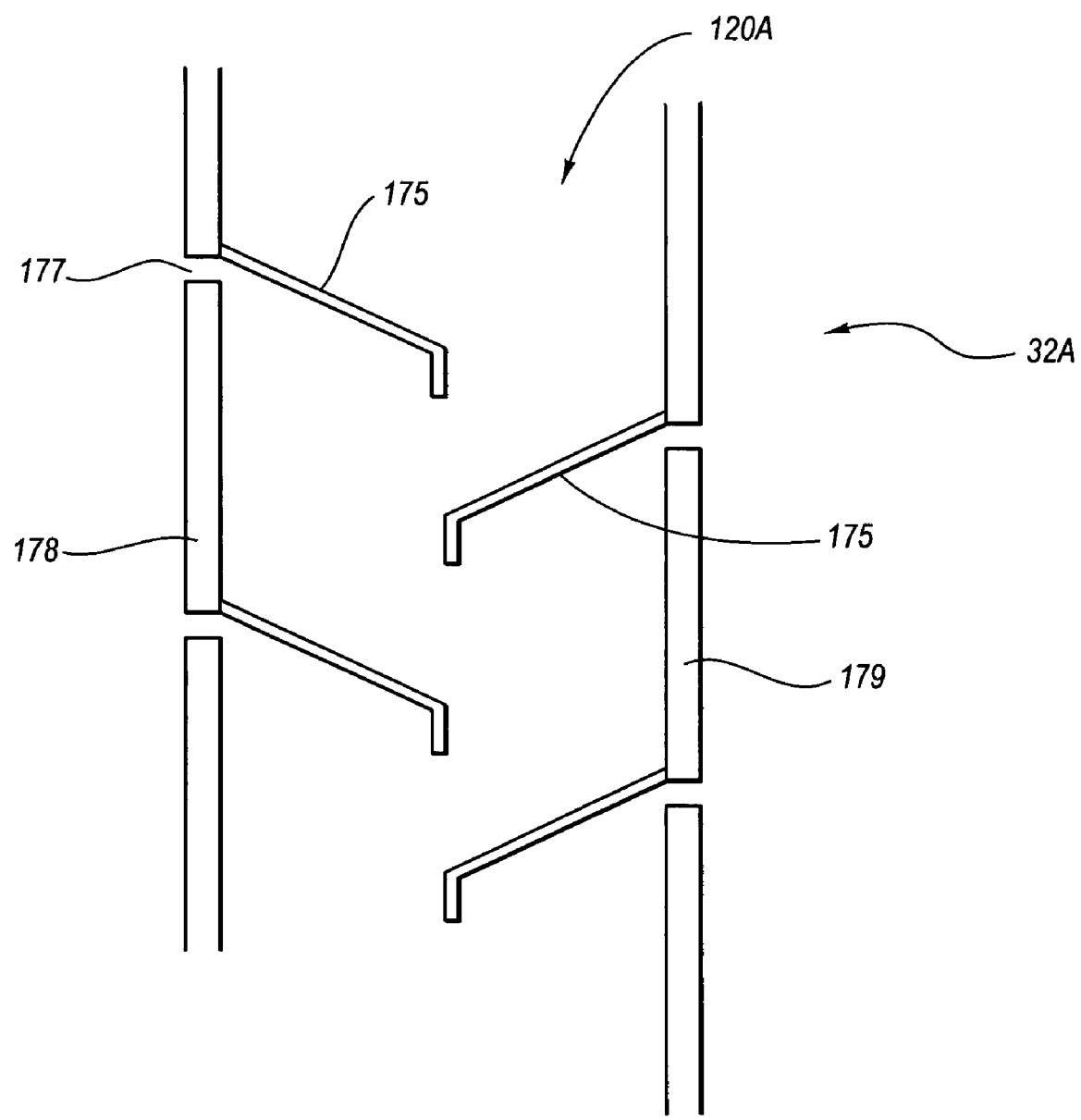
FIG. 13 is a cross sectional side view showing an alternative retort design.

Finally, depicted in FIG. 13 is another alternative embodiment of a retort 32A having opposing side walls 178 and 179 bounding a heating chamber 120A. Inwardly and downwardly projecting from side walls 178 and 179 are baffles 175. Baffles 175 are vertically staggered and projecting from alternating side walls. Baffles 175 extend toward each other so that the free ends are vertically aligned or overlapping. Accordingly, as the feed material passes through heating chamber 120, the feed material is forced to travel around each of the baffles 175 so as to provided substantially uniform mixing of the feed material.

In one embodiment, the baffles 175 are heated as discussed above. As the heated feed material passes over one baffle and on to another, the oil vapor emitted from the feed material is captured by the bottom surface of the above baffle. Due to the slope of the baffle 175, the oil vapor collects to a port 181 where it is extracted for subsequent processing.

In one embodiment of the present invention means are provided for heating the feed material within the heating chamber of the retort. By way of example and not by limitation, one embodiment of the means for heating comprises the various means for heating the baffles as discussed herein. In yet other embodiments, the means for heating comprises the various means for heating the side wall of the retort as discussed herein. In yet other embodiments, it is appreciated that various pipes or tubes can be disposed within the heating chamber. Heated gases or liquids could then be passed through the pipes or tubes so as to heat the feed material. Electrical conduits can also be disposed directly within the heating chamber. In yet another embodiment, heated gas can be pumped into heating chamber so as to heat the feed material. The present invention also envisions that other conventional systems can be used for heating the feed material within the heating chamber. In alternative embodiments, any one or combinations of the above systems can be used to heat the feed material within the heating chamber so as to extract the oil vapor and other gases.

Figure 14:
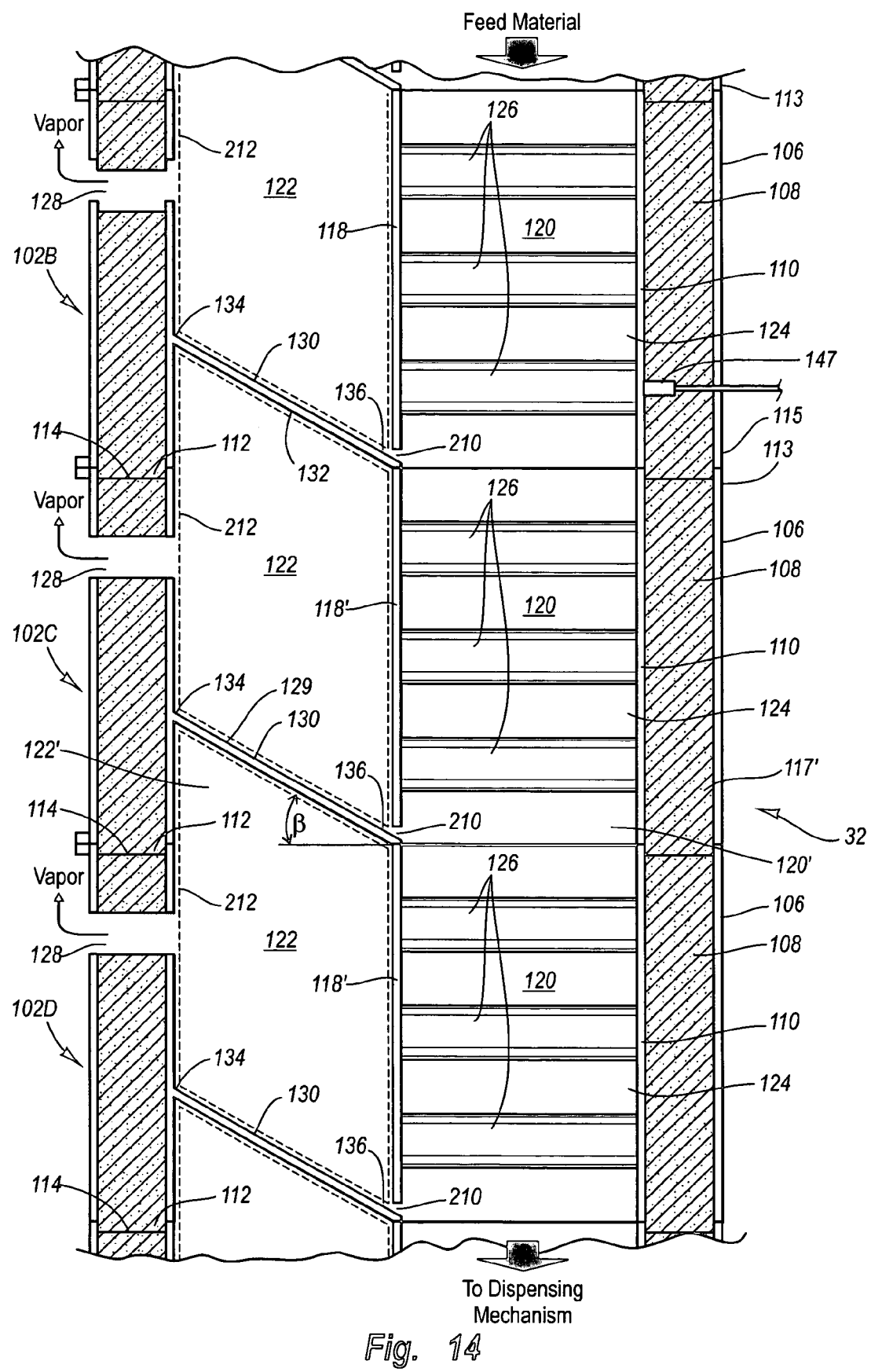
FIG. 14 is a cross-sectional side view of the retort shown in FIG. 2.

Returning to FIG. 3, vapor chamber 122 communicates externally through a vapor port 128 extending through side wall 123. A collection plate 130 is disposed within vapor chamber 122. Collection plate 130 has a top surface 129 and an opposing bottom surface 131 each extending between opposing side edges 132 and 133. Side edges 132 and 133 extend to and can connect with front wall 119 and back wall 121, respectively. Collection plate 130 also includes an outer edge 134 and an inner edge 136 and is disposed at an inside angle β relative to the horizontal (FIG. 14). In one embodiment the angle β is in a range between about 50° to about 75° with about 60° to about 65° being more common, although other angles can also be used.

Outer edge 134 of collection plate 130 extends to and can be coupled with side wall 123 at a location at or below vapor port 128. Inner edge 136 is disposed below the bottom end of partition wall 118 so that a return slot 210 is formed between partition wall 118 and inner edge 136 of collection plate 130. Return slot 210 typically has a height in a range between about 1 cm to about 6 cm and provides fluid communication between heating chamber 120 and vapor chamber 122.

As previously discussed with regard to FIG. 2, formation of retort 32 entails vertical stacking of modular units 102 in the form of a tower. In one embodiment of the present invention, means are provided for joining adjacent modular units 102. By way of example, a flange 111 outwardly projects at top end 113 and bottom end 115 of each unit 102. Flanges 111 may be formed integrally with outer housing 106 or attached thereto. Once units 102 are stacked, flanges 111 from adjacent modular units 102 are connected by means known in the art such as, but not limited to, bolting, clamps, screws and like. A sealing gasket (not shown) can also be disposed between each modular unit 102 so as to prevent the leaking of air therebetween.

In the embodiment shown in FIG. 14, at bottom end 115 of each modular unit 102, insulation layer 108 extends below outer housing 106 and inner housing 110 so as to form a tenon 112. At top end 113 of each modular unit 102, insulation layer 108 extends below outer housing 106 and inner housing 110 so as to form a mortise 114. The tenon 112 of each modular unit 102 is configured to be received within the corresponding mortise 114 of the adjacent modular unit 102 so as to provide a secure engaging fit between modular units 102 when stacked.

It is appreciated that any number of conventional brackets, flanges, clamps, connectors or the like can be used to secure adjacent modular units 102 together. Although not required, the assembled modular units 102 are typically secured to a framework (not shown), such as a building or support frame, to enhance support and structural stability. In some embodiments, the framework is independent of modular units 102 and assembled during or after retort 32 is assembled. In other embodiments, the framework is formed integrally with the modular units 102 and is connected to the framework of an adjacent modular unit 102 to form the retort stack.

Retort 32, formed by the stacked modular units 102, functions and has features substantially the same as a single modular unit 102. For example, retort 32 also includes a partition wall 118', a heating chamber 120', and a vapor chamber 122' which simply comprise the aligned partition walls 118, aligned heating chambers 120, and aligned vapor chambers 122, respectively, of the stacked modular units 102. Elements which are common between retort 32 and a single modular unit 102 will be identified by like reference characters with the common reference characters for retort 32 further including an "'".

Although retort 32 is shown and described as being comprised of multiple modular units 102, retort 32 can be formed with an integral continuous perimeter wall 117' or can be formed from any number of discrete members that are removably or permanently secured together.

As depicted in FIG. 14, heating chamber 120' extends in a continuous fashion the full height of retort 32. Feed mechanism 30, as shown in FIG. 2, is mounted directly above heating chamber 120' so as to selectively feed the feed material into the top of heating chamber 120'. As discussed below in greater detail, discharging mechanism 33 is disposed at the base of retort 32 in communication with heating chamber 120'. Discharge mechanism 33 expels the spent feed material from heating chamber 120'at a desired rate so as to produce the flow of feed material through heating chamber 120'. Discharge mechanism 33 is typically designed so that it permits the continuous extraction of spent material while preventing any significant exterior air flow from entering heating chamber 120'.

Returning again to FIG. 4, unlike heating chamber 120' which continuously extends the full height of retort 32, vapor chamber 122' is partitioned at spaced intervals by collection plates 130. Vapor chamber 122' thus comprises a plurality of vapor compartments 212 which are identified by the dashed lines. Each collection compartment 212 is bounded above by bottom surface 131 of a collection plate 130 and is bounded below by top surface 129 of a collection plate 130. Furthermore, each collection compartment 212 has a corresponding vapor port 128 and return slot 210. It is also appreciated that the top and bottom of vapor chamber 122' are covered so as to prevent the escape of oil vapors thereat.

Operation of retort 32 initially entails filling heating chamber 120' with the feed material. Although the feed material could simply be feed into the top of empty heating chamber 120' by feed mechanism 30, the initial feed material would rapidly fall down through the empty heating chamber 120' striking baffles 126. As a result, the initial feed material would at least partially break apart spreading dust and other fine particles within retort 32. In one embodiment it is desirable to minimize the formation of dust and other fine particles within retort 32 as such particles can hamper and potentially clog operation of retort 32.

Accordingly, to avoid the above problem, in one embodiment heating chamber 120' is initially filed with an inert fill material. The fill material is clean and sufficiently hard that it will not break apart as it is dispensed into heating chamber 120', such as by feed mechanism 30. In addition, the fill material will not break down or give off unwanted vapors as it is subject to the processing of retort 32. By way of example, fill material can comprise utelite, vermiculite, pearllite or other forms of ceramic. Other hard and inert materials, such as pieces of metal, graphite, or the like, can also be used. The fill material is typically within the same size range as the feed material but can also be larger or smaller.

Once heating chamber 120' is filled with the fill material, heating chamber 120' is also filled with an inert heavy gas, such as carbon dioxide or nitrogen, so as to substantially remove all of the air, and more importantly oxygen, from heating chamber 120'. The air is removed so that as the fill material is fed into heating chamber 120', the heat from baffles 126 does not cause the feed material to combust. Once the air is removed, discharge mechanism 33 begins to discharge the fill material from the bottom of heating chamber 120'. Simultaneously, feed mechanism 30 begins to dispense the feed material into the top of heating chamber 120'. As a result, the feed materials beings to descend down through heating chamber 120'. As previously mentioned, both feed mechanism 30 and discharge mechanism 33 operate to either feed or discharge the feed material while substantially preventing the free flow of external air into heating chamber 120'. Due to the lack of oxygen, the feed material cannot combust within heating chamber 120'.

The rate at which the fill material, and subsequently the spent feed material, is extracted from heating chamber 120' by discharge mechanism 33 determines the flow rate of the feed material through heating chamber 120'. This flow rate is regulated so that the feed material continuously flows through retort 32 without formation of any stationary pocket of feed material. By way of example and not by limitation, in one embodiment the feed material flows through heating chamber 120' at a rate of about 908 kg/hour (2,000 lbs per hour). This equates to a vertical travel of about 15 cm per minute (six inches per minute). It is envisioned that in one embodiment a full-size retort 32 will process about 765 cubic meters per day (1,000 cubic yards per day) of feed material.

As the feed material travels down through heating chamber 120', the feed material passes over and around the array of baffles 126. The surrounding feed material and the internal structure of heating chamber 120' forces the descending feed material to follow generally curved paths, such as approximately helical paths, sinusoidal paths, undulating paths, irregularly meandering paths, and/or other curved paths. The dynamic flow of the feed material through baffles 126 uniformly mixes the feed material and minimizes any constant contact by two feed material particles descending through heating chamber 120'. By minimizing constant contact of particles, the formation of clinkers, where two or more particles bind together, can be minimized or eliminated. The formation of clinkers can block the flow the feed material through baffles 126 and reduce efficiency of oil vapor extraction.

Figure 15:
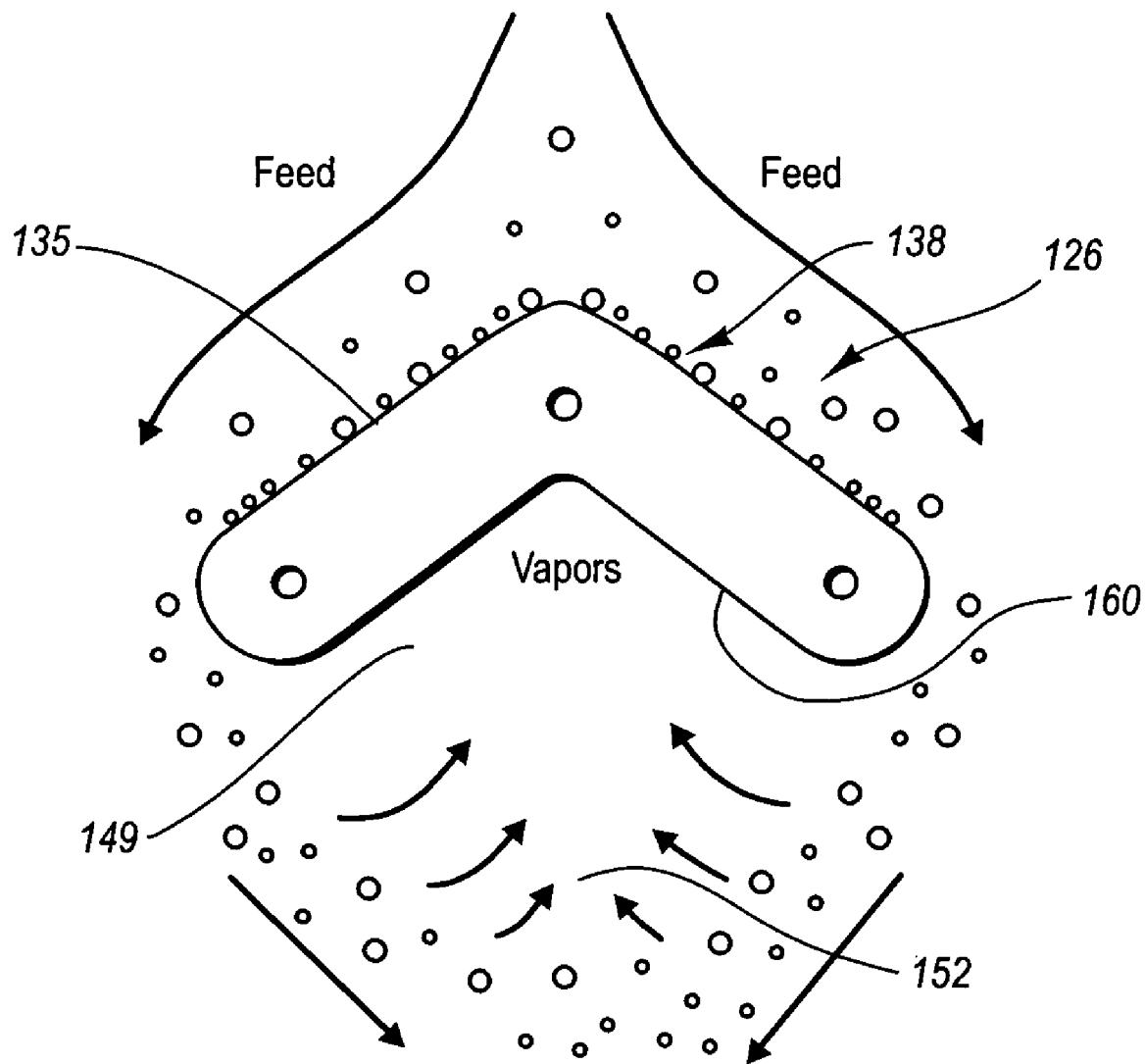
FIG. 15 is an elevated side view of the baffle shown in FIG. 4 showing a schematic representation of the flow of feed material therearound.

By way of example, as the feed material travels down through heating chamber 122' as depicted in FIG. 15, a portion of the feed material directly contacts and moves along the heated top surface 135 of the first row of baffles 126. In one embodiment all of baffles 126 within retort 32 are the same temperature or are within a temperature range of between about 400° C. to about 600° C. The feed material is introduced at the elevated temperature from dryer 22 and then is continually heated as it descends within heating chamber 122' until the feed material is about 400° C. to about 600° C. at the bottom end of heating chamber 122'. As a result of the prior use of dryer 22, the amount of water vapor within heating chamber 122' is minimized. Significant amounts of water vapor are detrimental in that the water vapor can combine with dust particles to form mud balls or otherwise aggregate feed materials particles which can then block the flow of the feed material.

By directly contacting top surface 135 of baffles 126, that portion of the feed material rapidly absorbs energy which is used for heating the feed material and/or converting the oil, oil precursors, and other organics into oil vapor and hydrocarbon gases. As the feed material in direct contact with top surface 135 passes over baffles 126, the feed material freely rolls underneath the first row of baffles 126. The heated feed material directly below baffles 126 is exposed to an open space 152 in vertical alignment with collection channel 149. As a result of the staggering of rows of baffles 126, the other feed material particles that did not directly contact the first row of baffles 126 are now aligned for contacting the next row of heated baffles 126. Thus, the feed material moves through the array of baffles 124 in a fluidized manner so that the feed material is continually mixed and periodically contacts heated baffles 126. As a result, the feed material has a substantially uniform temperature at each vertical stage of heating chamber 120'.

Although not necessarily required, substantial uniform heating of the feed material along heating chamber 120' has a number of benefits. First, uniform heating of the feed material ensures optimal extraction of the oil vapor and hydrocarbon gases from all of the feed material. Furthermore, uniform heating of the feed material along heating chamber 120' ensures that substantially the same types of oil vapor and hydrocarbon gas are being emitted at the same vertical stages. This enables at least partial fractional vaporization of the oil vapors and hydrocarbon gases at the time of formation. For example, as the feed material is heated, the feed material initially gives off any remaining moisture in the form of water vapor. The feed material remains at a temperature at about 100° C. until all of the moisture is removed. Once the moisture is gone, the feed material increases in temperature stages as different types of oil vapors are generated. Where the feed material is oil shale, the different types of oil vapors that are generated at successfully higher temperatures are typically: light naphthalene, heavy naphthalene, light kerosene, heavy kerosene, light diesel, heavy diesel, and residual gas oil. At the higher temperatures beyond residual gas oil vapor, hydrocarbon gases continue to form such as butane, methane, and propane. By the time the feed material reaches discharge mechanism 33, substantially all of the oil vapor is removed the feed material.

The oil vapors and hydrocarbon gases generated from the feed material rise within heating chamber 120' and are captured in collection channels 149 formed on bottom surface 137 of baffles 126 (FIG. 5). As a result of the feed material freely rolling into the open space under baffle 126 after directly contacting the baffle 126 (FIG. 15), the feed material receiving the highest energy is temporarily freely exposed to more easily emit the oil vapors and gases. Furthermore, because these particles are directly below baffle 126, they are in vertical alignment with collection channel 149 of the corresponding baffle. As a result, there is an increased efficiency in the collection of the oil vapor and hydrocarbon gases at the baffle 126 that is heating the feed material. In turn, the gases and oil vapor travel along collection channels 149, through the corresponding opening 170 in partition wall 118 and into a corresponding collection compartment 212. (FIG. 14). A vacuum source may be used to assist in drawing the gases and oil vapor from collection channels 149 into collection compartment 212. Furthermore, a gas jet 147 (FIG. 14) aligned with each collection channel 149 can be used to push or otherwise direct the gases and oil vapor into collection compartment 212.

As the feed material is heated and passed down through baffles 126, a small amount of dust is generated. This dust if often carried by the gas and oil vapor into vapor compartments 212. Because it is desirable to separate the dust from the gas and oil vapor prior to processing of the gas and oil vapor and it is desirable to retain the dust within heating chamber 120' for subsequent discharge through discharge mechanism 33, in one embodiment of the present invention means are provided for reducing dust in the gas and oil vapor prior to removal of the gas and oil vapor from vapor chamber 122'.

By way of example and not by limitation, vapor compartments 212 are bounded above and below by collection plates 130 as discussed above. As the gas and oil vapor carrying the dust enters a collection compartment 212, the velocity of the gas and oil vapor decreases causing at least a portion of the dust to settle within collection compartment 212 under the force of gravity onto top surface 129 of the lower collection plate 130. In turn, the dust slides down collection plate 130 and back into heating chamber 120' through the corresponding return slot 210. Although the dust may again become entrained in the gas or oil vapor as it falls within heating chamber 120', at least a majority of such dust will now enter the next lower collection compartment 212. As a result, the dust continues to travel down through the vapor compartments 212 until it is removed through discharge mechanism 33.

In one embodiment collection plates 130 comprise a metal planar sheet that covers the entire collection compartment 212. Alternatively, collection plates 130 may cover a portion or majority of collection compartment 212. During assembly, collection plates 130 may be provided separate from modular units 102 and subsequently attached thereon. Alternatively, collection plates 130 may be constructed at the same time as inner housing 110 and partition wall 118 and maintained as a permanent fixture of modular units 102. Collection plates 130 may be connected to inner housing 110 and/or partition wall 118 by any means known in the art such as, but not limited to, welding, bolting, riveting, soldering, and the like. Furthermore, in contrast to each collection plate 130 being disposed below a bottom end of partition wall 118, collection plate 130 can be connected directly to partition wall 118 and a return slot can be formed through collection plate 130.

Collection plates 130 can also be used in fractionalizing the gas and oil vapors generated from the feed material. As previously discussed, the uniformly heated feed material generates different oil vapors and hydrocarbon gases at different vertical stages within heating chamber 120'. Accordingly, by selectively placing collection plates 130 at different vertical regions where the different gases and oil vapors are generated, one or more collection compartment 212 can be used to primarily collect a discrete gas or oil vapor. Each separated gas or oil vapor is then passed through the corresponding vapor port 128 to a discrete separator 36 for further processing as discussed below. Fractionalizing the oil vapors and gases at the time of production minimizes the cost of subsequent processing. Alternatively, however, all or some of the vapor ports can connect to a single line which transfers all or select portions of the gases and oil vapor to a single separator 36. The oil vapors can be condensed separately to produce liquids having different oil content. Alternatively, the oil vapors can be combined and condensed together, producing a liquid product that can be further refined by known refinery processes.

In view of the forgoing, it is appreciated that the location for each collection plate 130 can be different for each modular unit 102 based on the feed material, processing parameters, and desired fractional vaporization. In one embodiment a single modular unit 102 can have two or more vapor ports 128 and collection plates 130 while in other embodiments vapor ports 128 and collection plates 130 can be eliminated from at least some of modular units 102.

Process logic control (PLC) 34 as shown in FIG. 1 can be used to control the temperature at various levels of retort 32. Baffles 126 are connected at least indirectly to process logic control 34 to control the temperature of each baffle 126. Process logic control 34 can include feedback loops in order to adjust the temperature of the baffles to obtain a certain temperature profile.

Other process variables can also be controlled by process logic control 34. For example, process logic control 34 can control the flow rate of feed material through retort 32 in order to produce the optimum yield. This can be accomplished by controlling the feed mechanism 30, the discharge mechanism 33, and may also be correlated with the temperature profile of the retort. For instance, if the feed material is not getting hot enough to optimize gas and oil vapor extraction, process logic control 34 can either increase the temperature of baffles 126 and/or slow down the flow of feed material through heating chamber 120'.

It is appreciated that all of the components of retort system 10 can be connected with process logic control 34. In turn, process logic control 34 can be positioned on-sight or off-sight for remote operation of retort system 10.

Figure 16:
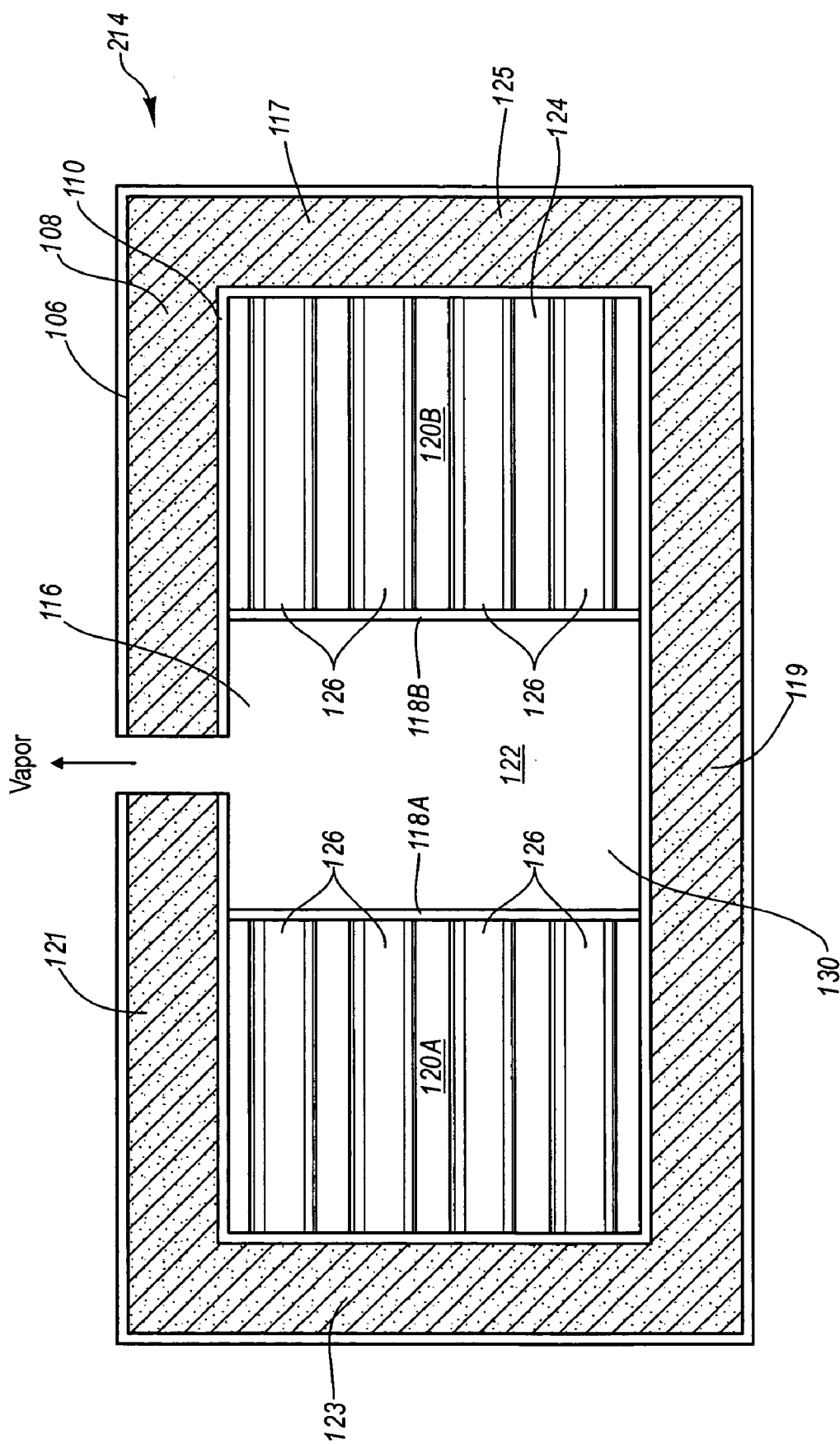
FIG. 16 is a cross sectional top view of an alternative embodiment of the modular unit shown in FIG. 8.

Depicted in FIG. 16 is an alternative embodiment of a modular unit 214. Like elements between modular units 102 and 214 are identified by like reference characters. Modular unit 214 comprises a first heating chamber 120A and a second heating chamber 120B that are separated by a central vapor chamber 122. A first partition wall 118A is disposed between first heating chamber 120A and vapor chamber 122 while a second partition wall 118B is disposed between second heating chamber 120B and vapor chamber 122. An array of baffles 126 are disposed in each heating chamber 120A and 120B. Collection plate 130 can be positioned within vapor chamber 122 so as slope toward heating chamber 120A or 120B. Furthermore, collection plate 130 can have a substantially inverted V-shaped transverse cross section so that one side slopes toward heating chamber 120A while the other side slopes toward heating chamber 120B.

As a result of having two heating chambers operate with a single vapor chamber, modular unit 214 increases production output while minimizing material cost and required operating space. Again, two or more modular units 214 can be stacked to form a retort. Alternatively, an integral retort can be formed having the configuration of modular unit 214.

It is appreciated that retort 32 and the alternatives thereto can be used independently or in parallel with one or more other retorts. As a result, a facility can be established having desired production rates based on the number of retorts formed.

VIII. Discharge Mechanism and Disposal of Spent Feed Material

As discussed above, the spent feed material is removed from retort 33 through discharge mechanism 33. As depicted in FIG. 2, discharge mechanism 33 comprises a hopper 196 operating in conjunction with a rotary valve 33B. Rotary valve 33B is substantially the same as rotary valve 30A and operates to remove the spend feed material while preventing the free flow of air into heating chamber 120'. As an alternative to rotary valve 33B, sliding grates 35 as previously discussed as an alternative to rotary valve 30A can be used. Other alternatives for rotary valve 30A can also be used. If desired, discharging mechanism 33 can also be provided with a liquid extraction outlet (not shown) for any liquid oil that condenses in heating chamber 120'.

In one embodiment where the feed material comprises Green River oil shale, the spent material is discharged at a temperature of about 400° C. to about 600° C. In order to recover at least a portion of the heat energy, the spent feed material discharged from retort 32 is passed through one or more heat exchangers 38 as shown in FIG. 1.

In one embodiment depicted in FIG. 2, heat exchanger 38 is formed with hopper 196 of discharge mechanism 33. Specifically, hopper 196 has an outer sidewall 198 and an inner sidewall 200. A heating exchange tube 202 is coiled or otherwise disposed between the outer sidewall 198 and inner sidewall 200. Any suitable heat exchange fluid is run through exchange tube 202 so that the fluid absorbs the heat energy from the spent feed material as the spent feed material passes through hopper 196. The fluid from heat exchange tube 202 can then be used for other parts of the retort system, such as, for example, in a dryer 22 at the entrance of retort 32 or can be used to produce electricity to operate retort system 10.

In another embodiment for heat exchanger 38, hopper 196 feeds the spent feed material into a pipe 220 having a boundary wall 222. A heat exchange tube 224 is coiled within boundary wall 222 so as to encircle pipe 220. An auger 226 is disposed within pipe 220 for selectively moving the spent material along pipe 220. Accordingly, as the spent feed material is moved along pipe 220, the heat energy from the spent feed material is transferred to the heat exchange fluid passing through exchange tube 224. The spent feed material can be passed through multiple heat exchangers or other conventional energy recovery systems.

In some embodiments, the cooled spent feed material leaving heat exchanger 38 is further used for power generation by being burned. Spent oil shale feed material can have an energy value of about 1,400 BTU/lb. Such material can thus be burned to operate a conventional power generating plant, such as a steam power generation plant. In turn, the generated electricity can be sold or used to operate retort system 12. In one alternative, the hot spent feed material can be directly burned for power generation without passing through a heat exchanger. The higher temperature of the spent feed would help facilitate complete combustion of the carbon.

Before burning or disposing of the cooled spent feed material, the spent material is typically processed to extract any minerals retained therein. For example, in the mahogany shale located in Vernal, Utah, aluminum and sodium carbonate are found in the spent material. The aluminum can be processed from the spent material to produce a low-cost pure aluminum product which can be sold on the market. Furthermore, additional sodium carbonate can be extracted from the spent feed material. Advantageously, the spent material at the exit of retort 32 is broken up into finer particles to allow for washing of the spent material to extract these valuable minerals.

The resulting spent feed material also have good filtration properties. As such, the spent material can be used as a fill material, for example in mines or landfills, to prevent leaching of undesired materials such as heavy metals.

IX. Processing Gases and Oil Vapors

As illustrated in FIG. 1, oil vapor produced from retort 32 is sent to a separation and condensing process, denoted generally as separator 36, to produce the various desired oil products from the oil vapor. The mechanisms for processing the oil products will now be described in further detail.

As previously discussed, in one embodiment retort 32 may be designed to substantially fractionalize the oil vapor so that different grades of oil vapor may be collected in different collection chambers 122. For example, as previously discussed, oil vapors of light naphthalene, heavy naphthalene, light kerosene, heavy kerosene, light diesel, heavy diesel, and residual gas oil can be separately collected at the time of formation from the feed material. This initial fractionalization and collection of the separate grades of oil vapor, however, is typically not perfect. In one embodiment the separately collected streams of the different grades of oil vapor comprise at least 60%, more commonly at least 75% and preferably at least 90% by volume the primary grade of the oil vapor being collected.

Furthermore, secondary components such as water vapor, hydrocarbon gases and/or dust can also be mixed with the oil vapor. This combination of components is referred to herein as "smoke." As also previously discussed, the smoke can be further processed as separate streams, thus requiring discrete separators and condensers for each stream, or one or more of the streams of smoke can be combined prior to further processing.

Figure 17:
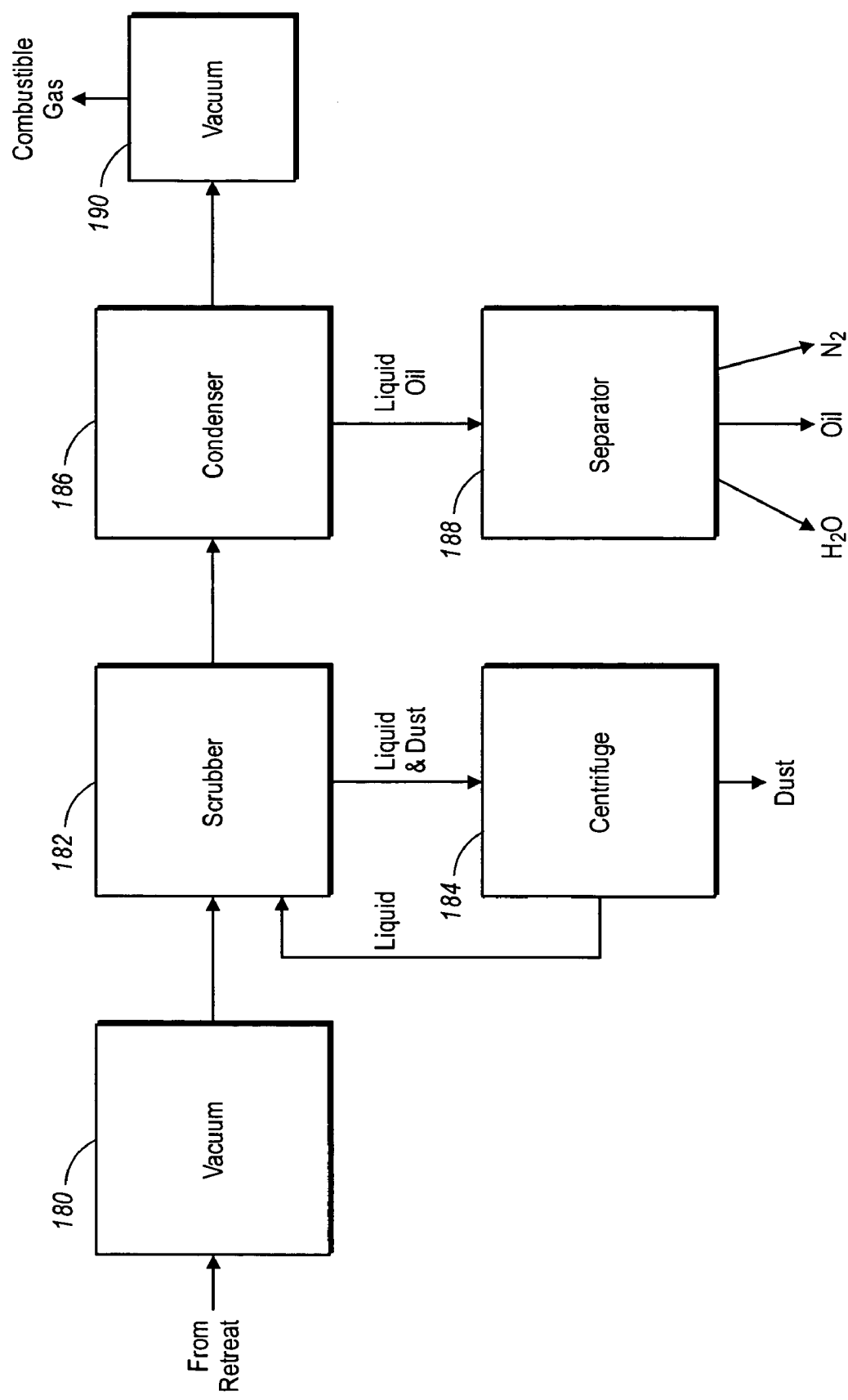
FIG. 17 is one embodiment of a flow diagram for condensing the oil vapor obtained from the retort of FIG. 2.

In order to create a more refined oil product, it is desirable to initially separate out any dust and water vapor from the oil vapor. Referring to FIG. 17, in one embodiment, smoke collected in a vapor chamber 122 is drawn out in the form of a stream through vapor port 128 of retort 32 by a vacuum 180. The smoke is delivered to a scrubber 182. Scrubber 182 traps suspended particles by direct contact with a spray of water or other liquid. In one embodiment, scrubber 182 comprises a spray tower. A suitable liquid spray may consist of water or an oil based material, for example, diesel, gasoline, or oil generated from the shale itself. Preferably, the spray liquid is a liquid that is readily found in the present retort and can be separated from the liquid product and recycled back into the system.

The liquid product containing the spray liquid and dust particles from scrubber 182 is sent to centrifuge 184 to separate the dust particles from the spray liquid. Other separation techniques may also be used to separate the spray liquid from the dust such as, but not limited to, cyclonic separation, filtration methods, adsorption methods and the like. The spray liquid can be recycled back to scrubber 182. The dust can be sent to the pelletizer and recycled through the system as feed material. It will be appreciated that the number of sprays in scrubber 182 will depend on system design requirements. Furthermore, a plurality of scrubbers 182 may be used in series to remove dust from the oil vapor. Scrubber 182 is merely representative of this step.

Figure 18:
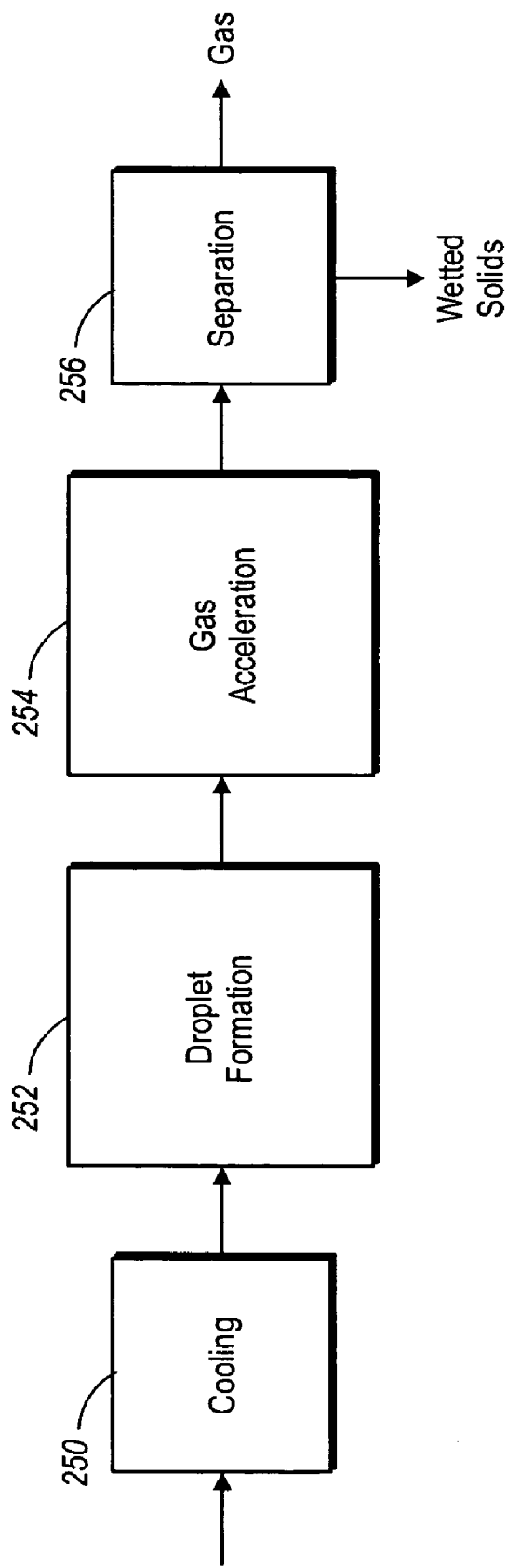
FIG. 18 is an alternative embodiment of a flow diagram show the separation of dust particles from the oil vapor.

Depicted in FIG. 18 is a modified method and system for the separation of the dust particles. In a first step 250, the smoke passing out of vapor chamber 122 is cooled to or near the bubble point of the mixture of hydrocarbons in the gaseous phase. This cooling can be accomplished in a number of ways. For example, the cooling can be accomplished by a heat exchanger, by introducing a cooled gas stream, by spraying liquid hydrocarbons into the smoke so that a portion of the liquid hydrocarbons evaporate to cool the smoke, or other conventional techniques.

In step 252, once the smoke is cooled, a liquid hydrocarbon stream is introduced so as to produce liquid droplets that do not evaporate under the temperature and pressure present in the smoke. In one embodiment the liquid droplets are formed by adding the liquid hydrocarbon stream through a spray nozzle or atomizer. The droplets can also be formed through the application of a centrifugal force. As in the above example, a suitable liquid spray may consist of water or any oil based material, for example, diesel gasoline. Preferably, the spray liquid is a liquid that is readily found in the present retort and can be separated from the liquid product and recycled back into the system.

Next, in step 254, to ensure that the dust particles are wetted by the added liquid droplets, the gas stream is accelerated. The acceleration increases the impact between the dust particles and liquid droplets. The acceleration can be accomplished in a number of different ways. For example, acceleration can be produced by reducing the cross sectional area of the line through which the smoke is traveling, changing the direction of flow, or applying a centrifugal force.

Finally, in step 256 the wetting dust particles are separated from the remainder of the gas stream. This separation can be accomplished using any number of conventional techniques such as gravity settling, centrifugal or acceleration separation, filtration, or the like. In turn the wetted particles can be reprocessed as discussed above while the remaining gas stream is processed as discussed below.

Returning to FIG. 17, the oil vapor and some water vapor exits scrubber 182 and enters condenser 186. Condenser 186 preferably comprises one of various packing materials, for example, ceramic balls, metal caps, or steel wool. Preferably, the packing material is cooled with an oil-based liquid. This prevents the packing material from becoming too hot and forming undesirable coke products. The oil vapors and water vapors condense into a liquid product and are drawn off the bottom of the condenser. The liquid oil and liquid water can be separated by known decanting or distillation processes illustrated generally as separator 188.

In addition, the liquid oil contains about 2% nitrogen compounds. These nitrogen compounds can be further extracted through processes known in the art to produce pure nitrogen products at separator 188. For example, in the mahogany oil shale found in Vernal, Utah, the gas oil product contains pyridine nitrogen, which contains anti-strip constituents that make this extracted product a high quality asphalt additive. This pyridine nitrogen can be extracted through known solvent extraction processes.

Conventional oil extraction processes lead to the abstention of nitrogen-containing condensed oil, and this nitrogen content makes subsequent oil refining difficult. These conventional methods rely on the subsequent hydrotreating of the condensed oil to destroy the nitrogen. This practice adds costs and complexity to the extractive process and furthermore destroys the nitrogen compounds that could otherwise be beneficially used. In contrast, embodiments of the extractive processes according to the present invention lead to the extraction of high quality oil, and also to the recovery of nitrogen compounds in a more simplified and cost effective process.

Any combustible gas not condensed are drawn off the top of the condenser by vacuum 190. The composition of the combustible gas depends on the type of feed material. Methane and propane with inert gases are usually the main components of the combustible gas that is generated in retort 32. This combustible gas can be combusted to generate power. Power generation is a preferred use of the combustible gas that is released in the retort, and this generated power can be recycled in the process of retort system 12, such as to generate the heat and/or the electric power that are supplied to retort 32 or to any other device in retort system 12. This power may also be sold on the market. Alternatively, the uncondensed oil vapors may be collected and separated to be sold on the market.

In one embodiment, using the above separation process, the oil produced from this process is about 10% naphthalene, 40% kerosene, 40% diesel and 10% gas oil. The extracted oil comprises premium grade oil that has been analyzed and determined to be of higher quality than Wyoming Sweet.

Figure 19:
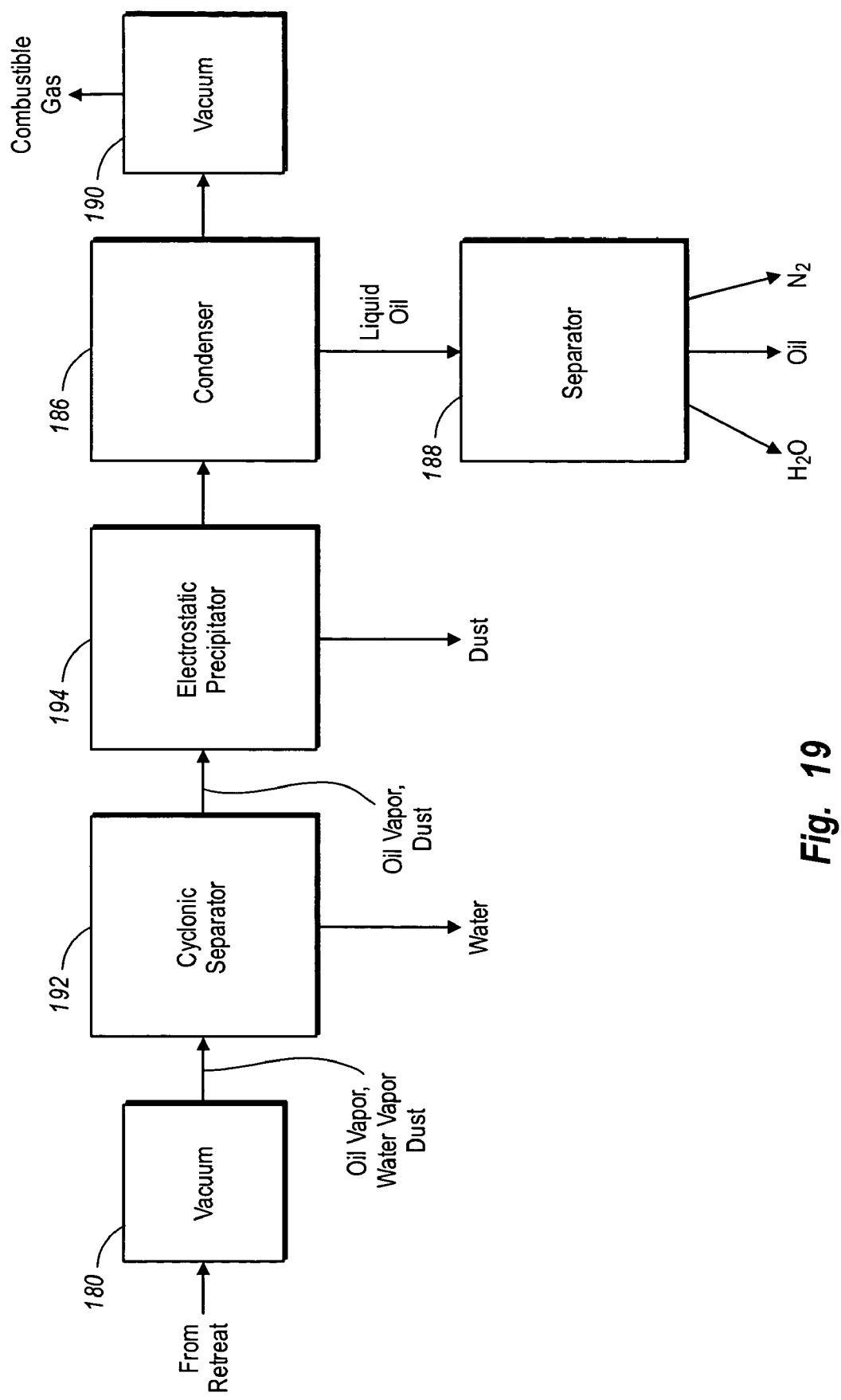
FIG. 19 is an alternative embodiment of a flow diagram for condensing the oil vapor obtained from the retort of FIG. 2.
Figure 6:
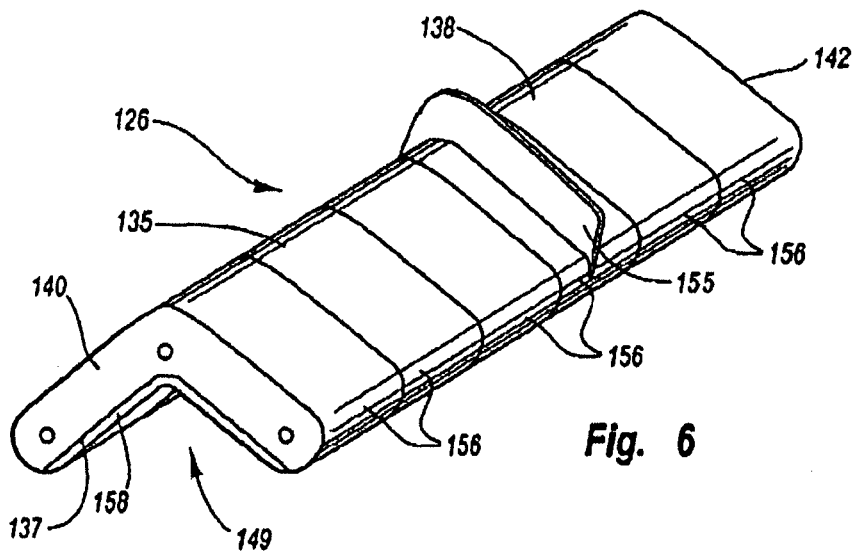
Figure 8:
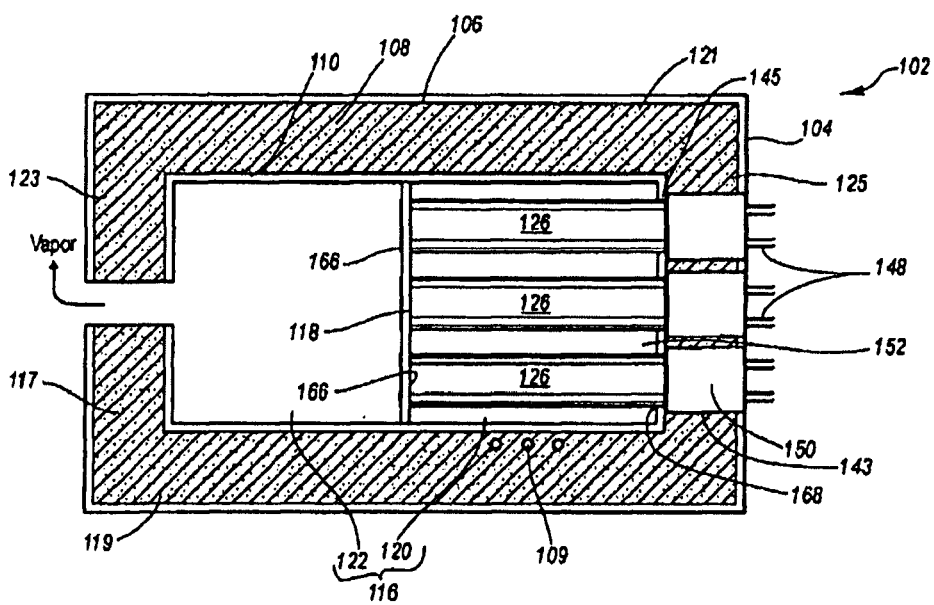

In another embodiment, illustrated in FIG. 19, separator 36 comprises a cyclonic separator 192 which separates the water vapor from the oil vapor and dust. The dust and oil vapor are then sent through an electrostatic precipitator 194. The electrostatic precipitator 194 separates the dust from the oil vapor. Alternatively, a scrubber can be used to separate the dust from the oil vapor. The oil vapor then goes to a condenser 186. The liquid oil can then be further processed by separator 188 into its constituent parts. Combustible gas is drawn out by a vacuum 190 and processed for power.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A baffle for use in heating and mixing a feed material within a retort, the baffle comprising:
    an elongated body having a top surface and an opposing bottom surface, at least a portion of the top surface having an inverted substantially V-shape configuration and at least a portion of the bottom surface at least partially bounding a collection channel adapted to collect gases or vapors;
    means for insulating at least a portion of the bottom surface of the elongated body; and
    means mounted at least partially on, within, or directly adjacent to the elongated body for selectively heating the elongated body.

2. A baffle as recited in claim 1, wherein the bottom surface has an inverted substantially U- or V-shaped transverse cross section that at least partially bounds the collection channel.

3. A baffle as recited in claim 1, wherein the top surface having the inverted substantially V-shape configuration terminates at an apex, the apex having a radius of curvature less than about 20 mm.

4. A baffle as recited in claim 1, wherein the baffle is comprised of a material capable of withstanding a temperature of at least 500° C.

5. A baffle as recited in claim 1, wherein the means for selectively heating comprises at least one electrical heating filament mounted at least partially on, within, or directly adjacent the body.

6. A baffle as recited in claim 1, wherein the means for insulating at least a portion of the bottom surface of the elongated body comprises the elongated body being tubular and having an interior surface bounding a chamber.

7. A baffle as recited in claim 6, wherein the means for selectively heating comprises a secondary body removably disposed within the tubular body.

8. A baffle as recited in claim 7, wherein the tubular body comprises a top wall on which the top surface is formed and an opposing bottom wall on which the bottom surface is formed, the secondary body being disposed within the chamber of the tubular body so that the secondary body biases against the top wall of the tubular body and the secondary body is spaced apart from the bottom wall of the tubular body.

9. A baffle as recited in claim 7, wherein an electrical heating filament is mounted on the secondary body.

10. A baffle as recited in claim 1, wherein the body is comprised of a plurality of interconnected sections.

11. A baffle as recited in claim 1, wherein the body has a first end and an opposing second end, an insulation plug being mounted to the first end of the body.

12. A baffle as recited in claim 11, wherein the body is comprised of a metal and the insulation plug is comprised of a refractory material.

13. A baffle as recited in claim 1, wherein the means for insulating at least a portion of the bottom surface of the elongated body comprises the top surface of the body comprising a first material and the bottom surface of the body comprising a second material, the second material being different than the first material such that when the body is heated, at least a portion of the bottom surface is cooler than the top surface.

14. A baffle for use in heating and mixing a feed material within a retort, the baffle comprising:
    an elongated body having a top surface and an opposing bottom surface, at least a portion of the top surface having an inverted substantially V-shape configuration and at least a portion of the bottom surface at least partially bounding a collection channel adapted to collect gases or vapors; and
    at least one electrical heating element mounted at least partially on, within, or directly adjacent to the elongated body for selectively heating the elongated body.

15. A baffle as recited in claim 14, wherein the top surface comprises a substantially planar first side face and a substantially planar second side face that are disposed in diverging planes.

16. A baffle as recited in claim 15, wherein at least the first side face or the second side face is disposed in a plane having an inside angle relative to the horizontal in a range between about 40° to about 80°.

17. A baffle as recited in claim 15, wherein the first side face and the second side face form an inside angle in a range between about 1° to about 70°.

18. A baffle as recited in claim 15, wherein a vertical plane extends through the body along the length thereof, a first inside angle formed between the first side face and the vertical plane being different than a second inside angle formed between the second side face and the vertical plane.

19. A baffle as recited in claim 14, wherein the top surface having the inverted substantially V-shape terminates at an apex, the apex having a radius of curvature less than about 5 mm.

20. A baffle as recited in claim 14, wherein the top surface comprises an upper portion which includes the inverted substantially V-shape configuration and a lower portion that slopes or curves away from the upper portion.

21. A baffle as recited in claim 14, wherein the bottom surface has an inverted substantially U- or V-shaped transverse cross section that at least partially bounds the collection channel.

22. A baffle as recited in claim 14, further comprising means for insulating at least a portion of the bottom surface of the elongated body.

23. A baffle as recited in claim 22, wherein the means for insulating at least a portion of the bottom surface of the elongated body comprises:
   the elongated body being tubular and having an interior surface bounding a chamber, wherein the tubular body comprises a top wall on which the top surface is formed and an opposing bottom wall on which the bottom surface is formed; and
   a secondary body removably disposed within the tubular body, the secondary body being disposed within the chamber of the tubular body so that the secondary body biases against the top wall of the tubular body and the secondary body is spaced apart from the bottom wall of the tubular body.

24. A baffle as recited in claim 22, wherein the means for insulating at least a portion of the bottom surface of the elongated body comprises the top surface of the body comprising a first material and the bottom surface of the body comprising a second material, the second material being different than the first material such that when the body is heated, at least a portion of the bottom surface is cooler than the top surface.

25. A retort heating apparatus for processing feed material, the retort heating apparatus comprising:
   a heating chamber bounded at least in part by a side wall, the side wall having a plurality of horizontally and vertically spaced apart apertures formed thereon so as to provide fluid communication through the side wall;
   a plurality of vertically and horizontally spaced apart baffles at least partially disposed within the heating chamber, each baffle comprising an elongated body having a top surface, at least a portion of the top surface having an inverted substantially V-shape configuration;
   means for heating the feed material within the heating chamber comprising an electrical heating element at least partially disposed on, within, or directly adjacent to each baffle; and
   a plurality of collection channels disposed within the heating chamber, each collection channel being aligned with a corresponding aperture, the collection channels being adapted to collect vapors and channel the vapors to the corresponding apertures.

26. A retort heating apparatus as recited in claim 25, wherein the portion of the top surface having the inverted substantially V-shape configuration comprises a substantially planar first side face and a substantially planar second side face that are disposed in diverging planes.

27. A retort heating apparatus as recited in claim 26, wherein the first side face and the second side face form an inside angle in a range between about 1° to about 70°.

28. A retort heating apparatus as recited in claim 25, wherein the top surface having an inverted substantially V-shape configuration terminates at an apex, the apex having a radius of curvature less than twice a maximum diameter of the feed material passing through the heating chamber.

29. A retort heating apparatus as recited in claim 25, wherein the top surface having an inverted substantially V-shape configuration terminates at an apex, the apex having a radius of curvature less than about 10 mm.

30. A retort heating apparatus as recited in claim 25, wherein the plurality of baffles are disposed in a plurality of vertically spaced apart rows, adjacent rows being horizontally staggered relative to each other.

31. A retort heating apparatus as recited in claim 25, wherein each body has a bottom surface, the bottom surface of at least a portion of the baffles at least partially bounding a corresponding collection channel.

32. A retort heating apparatus as recited in claim 25, further comprising a vapor chamber formed adjacent to the heating chamber, each aperture in the side wall providing fluid communication between the heating chamber and the vapor chamber.

33. A retort heating apparatus as recited in claim 32, further comprising:
   a collection plate disposed within the vapor chamber at a downwardly curved or sloped orientation, the collection plate having lower end disposed adjacent to the side wall and an opposing upper end disposed away from the side wall; and
   a return slot formed through the side wall at or adjacent to the lower end of the collection plate, the return slot providing fluid communication between the heating chamber and the vapor chamber.

34. A retort heating apparatus as recited in claim 32, wherein the vapor chamber is bounded above by a first downwardly sloping collection plate and the vapor chamber is bounded below by a second downwardly sloping collection plate.

35. A retort heating apparatus for processing feed material, the retort heating apparatus comprising: a heating chamber bounded at least in part by a sidewall; a plurality of vertically and horizontally spaced apart baffles at least partially disposed within the heat heating chamber, each baffle comprising an elongated body having a top surface, at least a portion of the top surface comprising a substantially planar first side face and a substantially planar second side face that are disposed in diverging planes, wherein the plurality of baffles has a common maximum width, the plurality of baffles including: a first row of baffles each horizontally separated by a first distance substantially equal to or less than the common maximum with; and a second row of baffles each horizontally separated by the first distance substantially equal to or less than the common maximum width, the second row of the baffles being vertically separated from the first row by a second distance, each baffle of the second row being centrally disposed substantially midway between corresponding baffles of the first row; and means for heating the feed material within the heating chamber, wherein the means for heating the feed material within the heating chamber comprises at least one electrical heating element mounted at least partially on, within, or directly adjacent to at least one of the plurality of baffles.

36. A retort heating apparatus as recited in claim 35, wherein the top surface of each body includes an elongated narrow ridge disposed between the first side face and the second side face.

37. A retort heating apparatus for processing a feed material, the retort heating apparatus comprising:
a heating chamber bounded at least in part by a side wall;
a plurality of baffles at least partially disposed within the heating chamber, each baffle comprising an elongated body having a top surface, at least a portion of the top surface being arched, the plurality of baffles being vertically and horizontally spaced apart so that substantially all of the feed material that vertically passes through the heating chamber is horizontally displaced as the feed material passes by the baffles; and
means for heating the feed material within the heating chamber comprising at least one electrical heating element disposed at least partially on, within or directly adjacent to each body.

38. A retort heating apparatus as recited in claim 37, wherein the portion of the top surface being arched has an inverted substantially U- or V-shape configuration.

39. A retort heating apparatus as recited in claim 37, further comprising means for feeding the feed material into the heating chamber while preventing the free flow of air into the heating chamber.

40. A retort heating apparatus as recited in claim 37, further comprising a plurality of apertures extending through the side wall.

41. A retort heating apparatus as recited in claim 40, wherein the body of each baffle has a bottom surface, the bottom surface of at least a portion of the baffles at least partially bounding a collection channel, each collection channel communication with a corresponding aperture.

42. A retort heating apparatus as recited in claim 40, further comprising a vapor chamber formed on a side of the side wall opposite the heating chamber, each aperture in the side wall providing fluid communication between the heating chamber and the vapor chamber.

43. A retort heating apparatus as recited in claim 42, further comprising:
a collection plate disposed within the vapor chamber at a downwardly curved or sloped orientation, the collection plate having a lower end disposed adjacent to the side wall and an opposing upper end disposed away from the side wall; and
a return slot formed through the side wall at or adjacent to the lower end of the collection plate, the return slot providing fluid communication between the heating chamber and the vapor chamber.

44. A retort heating apparatus as recited in claim 37, wherein each body is tubular and has an interior surface bounding a chamber.

45. A retort heating apparatus as recited in claim 37, wherein the means for heating the feed material comprises a secondary body removably disposed within the tubular body.

46. A retort heating apparatus as recited in claim 37, wherein the plurality of baffles are disposed in a plurality of vertically stacked rows, each row being horizontally staggered relative to the adjacent vertical row.

47. A retort heating apparatus as recited in claim 37, wherein for a select body the top surface is comprised of a first material and the bottom surface is comprised of a second material different than the first material such that when the body is heated, the bottom surface is cooler than the top surface.

48. A retort heating apparatus as recited in claim 41, further comprising a gas jet aligned with a collection channel of a select baffle.

49. A retort heating apparatus as recited in claim 37, wherein the plurality of baffles each have a common maximum width, the plurality of baffles comprising:
a first row of the baffles each horizontally separated by a first distance substantially equal to the common maximum width; and
a second row of the baffles vertically separated from the first row by a second distance, each baffle of the second row being centrally disposed midway between corresponding baffles of the first row.

50. A retort heating apparatus as recited in claim 49, wherein the maximum width of the baffles is in a range between about 5 cm to about 15 cm.

51. A retort heating apparatus as recited in claim 49, wherein the second distance is in a range between about 5 cm to about 10 cm.

52. A retort heating apparatus as recited in claim 37, further comprising a plurality of vertically stacked modular units, each modular unit having a perimeter wall that bounds a portion of the heating chamber, the perimeter wall of each modular unit also comprising a portion of the first wall and the second wall.

53. A method for processing a feed material, the method comprising:
passing a feed material down through a heating chamber of a retort, the heating chamber having a plurality of vertically and horizontally spaced apart baffles disposed therein;
heating the baffles using at least one electrical heating element disposed at least partially on, within or directly to at least one baffle such that as the feed material passes down through the heating chamber the feed material is heated so as to emit an oil vapor, the oil vapor rising within the heating chamber and entering into one of a plurality of collection channels;
gathering the oil vapor from the collection channels; and
condensing the oil vapor into an oil.

54. A method as recited in claim 53, further comprising separating the feed material by size prior to passing the feed material into the heating chamber so that the feed material has a maximum diameter in a range between about 2 mm to about 10 mm.

55. A method as recited in claim 53, further comprising washing the feed material prior to passing the feed material into the heating chamber.

56. A method as recited in claim 55, wherein the feed material is washed so as to remove at least a portion of the minerals within the feed material, thereby increasing the porosity of feed material.

57. A method as recited in claim 53, further comprising drying the feed material so that the water content of the feed material is reduced to less than at least 5% of the total weight of feed material and water.

58. A method as recited in claim 53, further comprising heating the feed material to a temperature of at least 100° C. prior to passing a feed material down through the heating chamber of the retort.

59. A method as recited in claim 53, wherein the oil vapor emitted from the feed material comprises a plurality of different types of oil vapor, the act of gathering comprising gathering the oil vapor into a plurality of discrete oil vapor streams, each oil vapor stream comprising at least 60% of one of the different types of oil vapors.

60. A method as recited in claim 59, wherein the different type of oil vapors comprise light naphthalene, heavy naphthalene, light kerosene, heavy kerosene, light diesel, heavy diesel and residual gas.

61. A method as recited in claim 59, further comprising separately condensing each of the different oil vapor streams.

62. A method as recited in claim 59, wherein each collection channel is formed on a bottom side of a corresponding baffle.

63. A method for processing a feed material, the method comprising: passing a feed material down through a heating chamber of a retort, the heating chamber having a first row of baffles disposed therein, the baffles having a common maximum width, each baffle in the first row being horizontally separated by a first distance substantially equal to or less than the common maximum width; passing the feed material down through a second row of baffles vertically separated from the first row by a second distance, each baffle of the second row being horizontally separated by the first distance substantially equal to or less than the common maximum width and each baffle of the second row being centrally disposed midway between corresponding baffles of the first row, such that substantially all of the feed material that vertically passes down through the heating chamber is horizontally displaced as the feed material passes by the baffles; heating the feed material within the heating chamber such that the feed material emits an oil vapor, wherein the means for heating the feed material within the heating chamber comprises at least one electrical heating element mounted at least partially on, within, or directly adjacent to at least one of the plurality of baffles, collecting the oil vapor from within the heating chamber; and condensing the oil vapor into an oil.

64. A baffle as recited in claim 1, wherein the means for selectively heating comprises at least one channel formed along at least a portion of the length of the elongated body, wherein the at least one channel is adapted to receive at least one of:

at least a portion of at least one electrical heating element; or heated fluid passing through at least a portion of the at least one channel.

65. A retort heating apparatus as recited in claim 35, wherein edges of the baffles in the first row of baffles substantially vertically align with edges of the baffles in the second row of baffles.

66. A retort heating apparatus as recited in claim 35, wherein edges of the baffles in the first row of baffles vertically overlap with edges of the baffles in the second row of baffles.

67. A method as recited in claim 63, wherein collecting the oil vapor from within the heating chamber comprises collecting the oil vapor in a collection channel formed on a bottom side of a corresponding baffle.

68. A method as recited in claim 63, wherein collecting the oil vapor from within the heating chamber comprises gathering the oil vapor into a plurality of discrete oil vapor streams, each oil vapor stream comprising at least 60% of one of different types of oil vapors.

69. A method as recited in claim 68, wherein the different type of oil vapors comprise light naphthalene, heavy naphthalene, light kerosene, heavy kerosene, light diesel, heavy diesel and residual gas.

70. A method as recited in claim 69, wherein condensing the oil vapor into an oil further comprises separately condensing each of the different oil vapor streams.

* * * * *

UNITED STATES PATENT AND TRADEMARK OFFICE
CERTIFICATE OF CORRECTION

PATENT NO. : 7,264,694 B2      Page 1 of 3
APPLICATION NO. : 10/767838
DATED : September 4, 2007
INVENTOR(S) : Merrell et al.

It is certified that error appears in the above-identified patent and that said Letters Patent is hereby corrected as shown below:

Drawing
Sheet 2, replace Fig. 2 with the figure depicted herein below, wherein the reference for the rotary valve has been changed from "33" to --33B-- and wherein the reference --226-- for the auger has been added

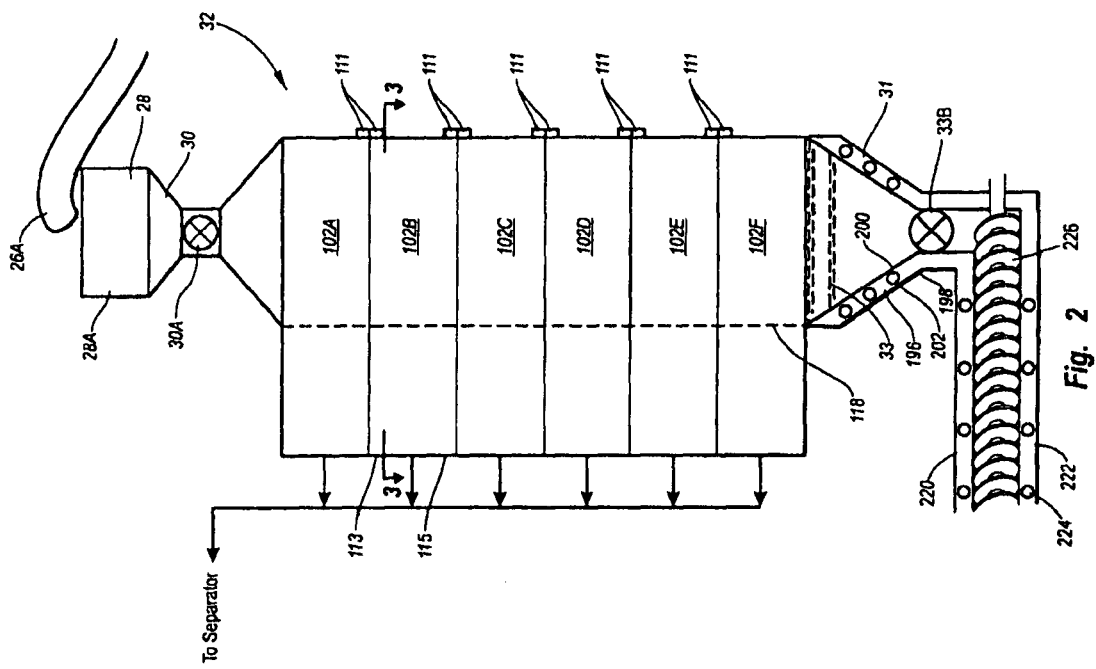

Signed and Sealed this

Fourth Day of May, 2010

David J. Kappos
*Director of the United States Patent and Trademark Office*

Drawing
Sheet 4, replace Fig. 6 with the figure depicted herein below, wherein the reference "154" has been changed to --155--

Sheet 7, replace Fig. 8 with the figure depicted herein below, wherein the reference "125" has been changed to --123-- and the reference "123" has been changed to --125--

CERTIFICATE OF CORRECTION (continued)
U.S. Pat. No. 7,264,694 B2

Column 8
Line 12, change "configuration" to --configurations--
Line 19, change "feed directly" to --fed directly--

Column 10
Line 26, after "partition wall" change "109" to --118--
Line 67, before "120" change "channel" to --chamber--

Figure 5I:
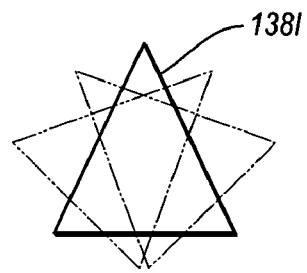

Column 11
Lines 38-39, change "FIG. 51" to --FIG. 5I--

Column 13
Line 2, change "123" to --125--
Line 17, change "123" to --125--
Line 24, change "134" to --143--
Line 34, change "123" to --125--
Line 36, change "123" to --125--
Line 54, change "123" to --125--

Column 16
Line 25, change "181" to --177--

Column 17
Line 64, change "120'at" to --120' at--

Column 18
Line 3, change "FIG. 4" to --FIG. 14--
Line 28, change "filed" to --filled--

Column 20
Lines 13-14, after "removed" insert --from--

Column 22
Line 29, change "retort 33" to --retort 32--

Column 23
Line 11, after "system", change "12" to --10--

Column 25
Line 32, after "system", change "12" to --10--
Line 35, change "12" to --10--

Claim 35
Column 28, line 60, change "the heat heating chamber" to --the heating chamber--
Column 29, line 1, "maximum with" to --maximum width--

UNITED STATES PATENT AND TRADEMARK OFFICE
CERTIFICATE OF CORRECTION

PATENT NO.         : 7,264,694 B2
APPLICATION NO.    : 10/767838
DATED              : September 4, 2007
INVENTOR(S)        : Merrell et al.

It is certified that error appears in the above-identified patent and that said Letters Patent is hereby corrected as shown below:

Column 1
Line 17, change "barrels/day" to --barrels--

Column 3
Line 19, change "show" to --showing--

Column 4
Line 16, change "a conveyer" to --conveyer--
Line 63, change "consist" to --consists--

Column 5
Line 5, change "cost" to --costs,--

Column 9
Line 41, change "unit" to --units--

Column 10
Line 30-31, change "mechanism" to --mechanisms--

Column 13
Line 23, change "embodiment" to --embodiment,--
Line 56, change "function" to --functions--

Column 16
Line 4, change "other" to --others--
Line 40, change "into" to --into the--

Column 18
Line 8, change "collection" to --vapor--

Signed and Sealed this
Fifteenth Day of May, 2012

David J. Kappos
*Director of the United States Patent and Trademark Office*

CERTIFICATE OF CORRECTION (continued)

U.S. Pat. No. 7,264,694 B2

Line 11, change "collection" to --vapor--
Line 28, change "feed" to --fed--
Line 51, change "beings" to --begins--

Column 19
Line 18, change "flow" to --flow of--
Line 22, change "122'''" to --120'--
Line 30, change "122'''" to --120'--
Line 31, change "122'''" to --120'--
Line 33, change "122'''" to --120'--
Line 36, change "materials" to --material--

Column 20
Line 14, change "the" to --from the--
Line 30, change "collection" to --vapor--
Line 33, change "collection" to --vapor--
Line 36, change "collection" to --vapor--

Column 21
Line 21, change "compartment" to --compartments--
Line 28, change "ports" to --ports 128--
Line 56, change "retort" to --retort 32--

Column 22
Line 9, change "as" to --as to--
Line 33, change "spend" to --spent--

Column 23
Line 14, change "feed" to --feed material--
Line 17, change "spent" to --spent feed--
Line 20, change "spent" to --spent feed--
Line 21, change "spent" to --spent feed--
Line 26, change "spent" to --spent feed--
Line 28, change "have" to --has--
Line 29, change "spent" to --spent feed--

Column 25
Line 28, change "is" to --are--